(12) United States Patent
Takahashi et al.

(10) Patent No.: US 7,593,596 B2
(45) Date of Patent: Sep. 22, 2009

(54) PHASE UNWRAPPING METHOD, PROGRAM, AND INTERFERENCE MEASUREMENT APPARATUS

(75) Inventors: Fumiyuki Takahashi, Kawasaki (JP); Hiroyuki Tsukahara, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 680 days.

(21) Appl. No.: 11/407,036

(22) Filed: Apr. 20, 2006

(65) Prior Publication Data

US 2007/0110334 A1    May 17, 2007

(30) Foreign Application Priority Data

Nov. 17, 2005  (JP) ............... 2005-332789

(51) Int. Cl.
  *G06K 9/36* (2006.01)
  *G06K 9/00* (2006.01)
(52) U.S. Cl. ............... 382/276; 382/145
(58) Field of Classification Search ............ 382/276, 382/275, 145, 146, 147, 286, 287, 294
  See application file for complete search history.

(56) References Cited

U.S. PATENT DOCUMENTS

| 5,608,405 A | * | 3/1997 | Pritt | 342/25 C |
| 6,011,625 A | * | 1/2000 | Glass | 356/496 |

FOREIGN PATENT DOCUMENTS

| JP | 10-90112 | 4/1998 |
| JP | 2001-241930 | 9/2001 |
| JP | 2002-195806 | 7/2002 |
| JP | 2003-042728 | 2/2003 |

OTHER PUBLICATIONS

Li An et al., "A Fast Implementation of the Minimum Spanning Tree Method for Phase Unwrapping", IEEE Transactions on Medical Imaging, vol. 19, No. 8, Aug. 2000, pp. 805-808.
P.J. Bryanston-Cross et al., "Application of the FFT Method for the Quantitative Extraction of Information from High-Resolution Interferometric and Photoelastic Data", Optics & Laser Technology, vol. 26, No. 3, 1994, pp. 147-155.

* cited by examiner

*Primary Examiner*—Yon Couso
(74) *Attorney, Agent, or Firm*—Staas & Halsey LLP

(57) ABSTRACT

A candidate pixel generating unit searches a path-undetermined adjacent pixel j which is adjacent around a parent pixel i, and, with respect to the searched adjacent pixel j, generates a candidate pixel having data $\{j(i,|Wij|)\}$ in which the parent pixel i and magnitude |Wij| of a phase difference Wij in which phase skip between the pixels is corrected are combined. The registration control unit registers the pixel to a heap having a function of ordering the registration order, and order the pixel, if the weight |Wij| is equal to or more than a predetermined threshold value TH; and registers the pixel to a queue not having the function of ordering the registration order if it is less than the threshold value TH. A path determination unit prioritizes the queue to retrieve and eliminate one candidate pixel, and determines a path between the eliminated candidate pixel and the parent pixel.

19 Claims, 21 Drawing Sheets

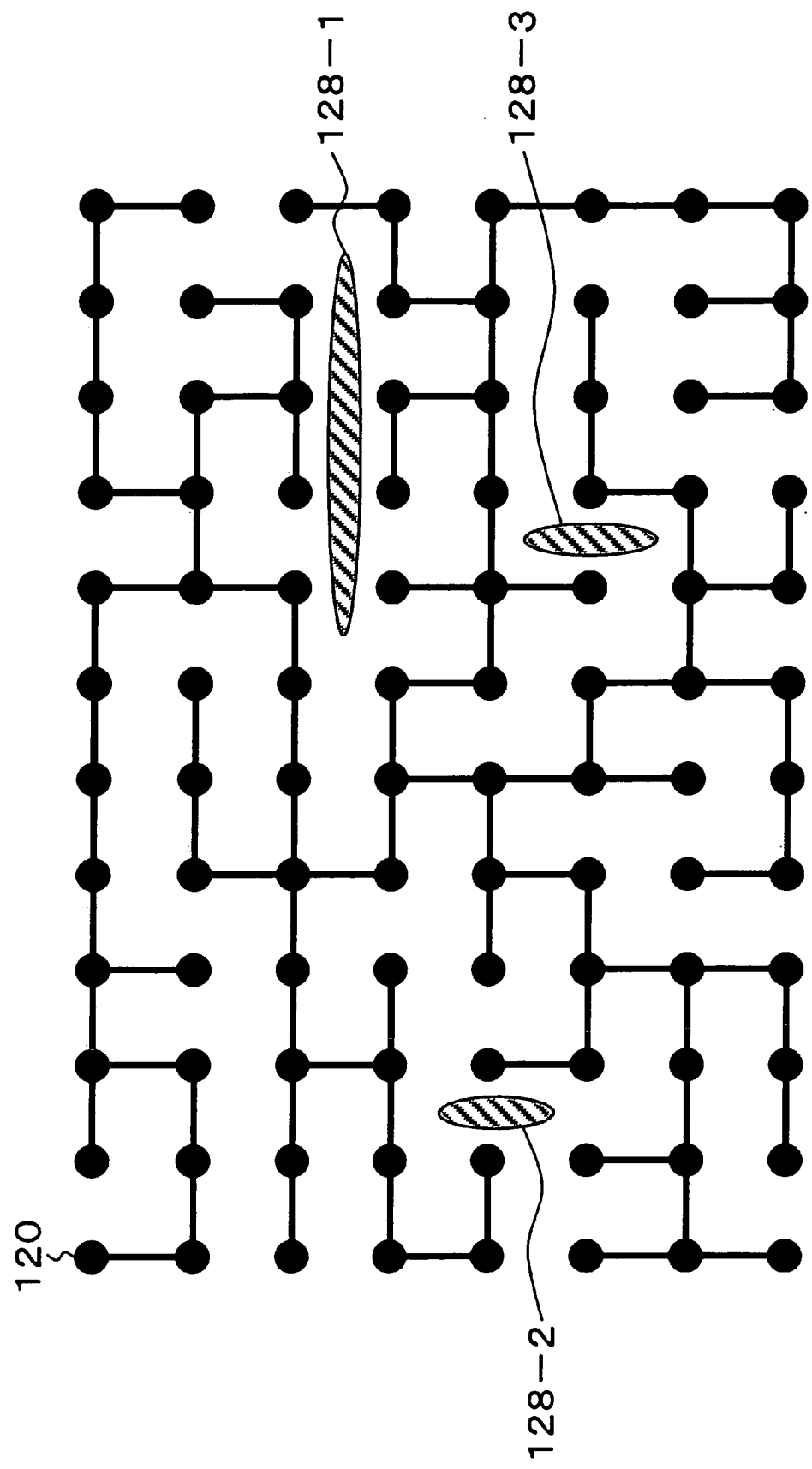

PRIOR ART
FIG. 6A
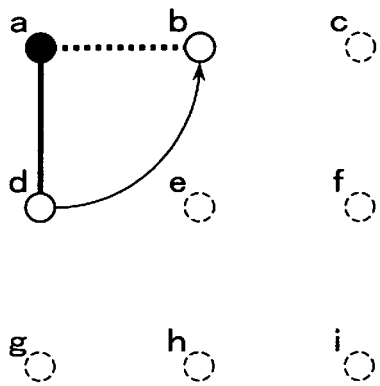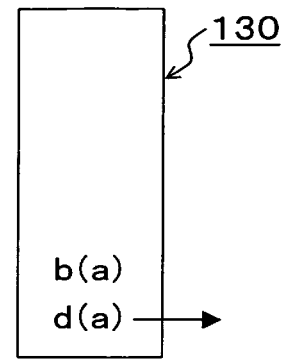
PRIOR ART
FIG. 6B
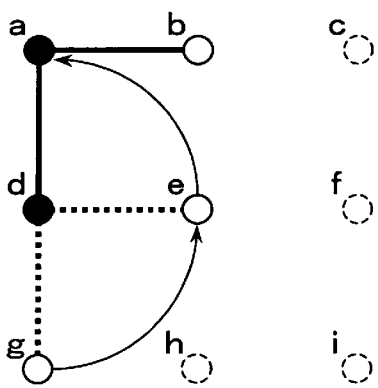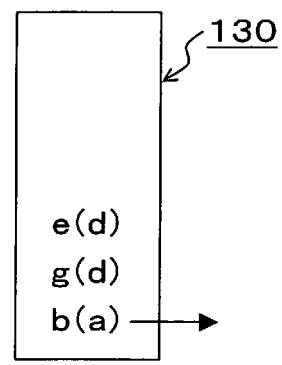
PRIOR ART
FIG. 6C
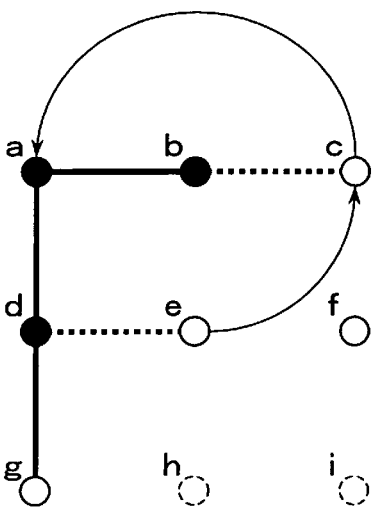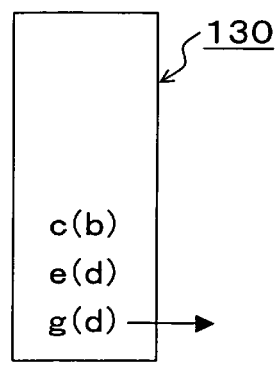

PRIOR ART
FIG. 7A
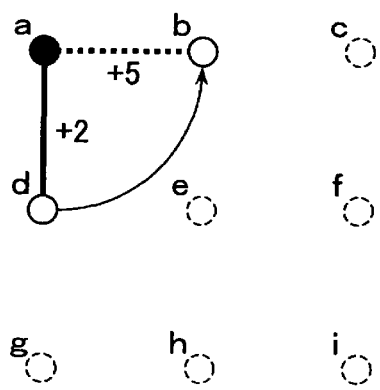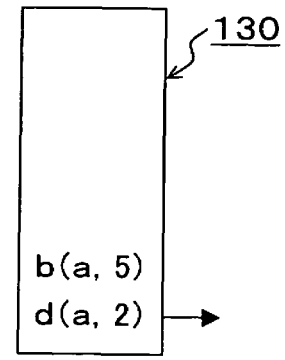
PRIOR ART
FIG. 7B
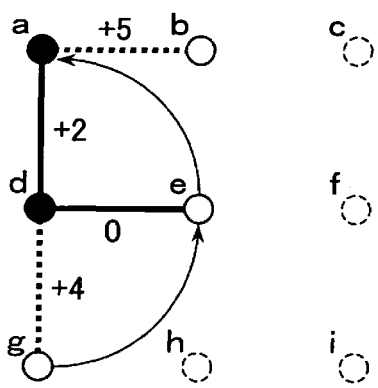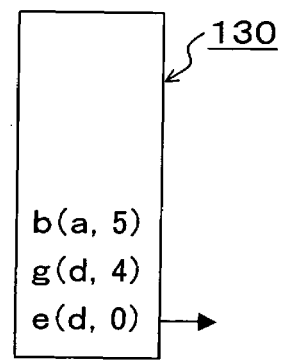
PRIOR ART
FIG. 7C
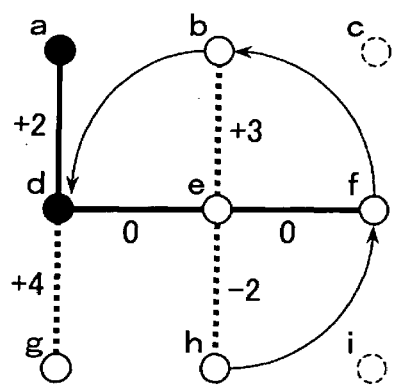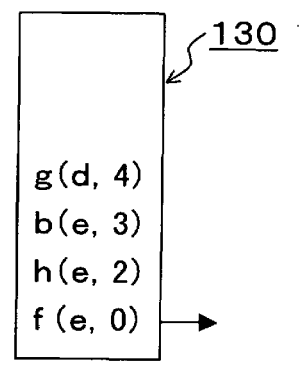

FIG. 11A 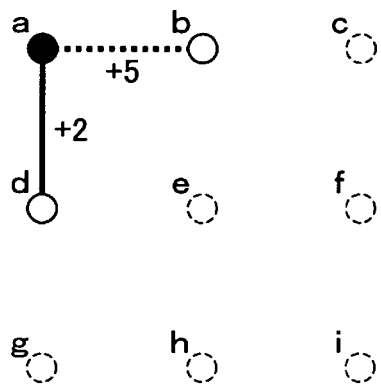 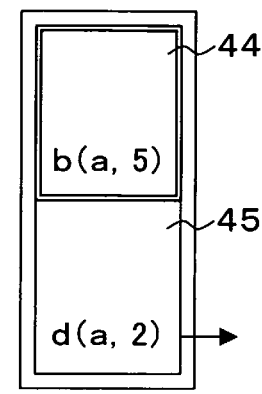
FIG. 11B 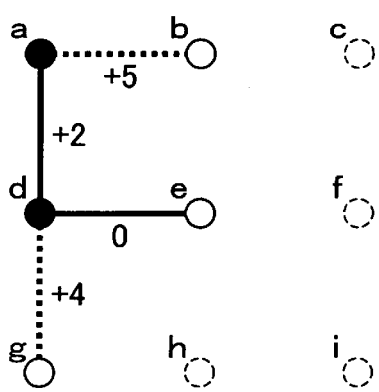 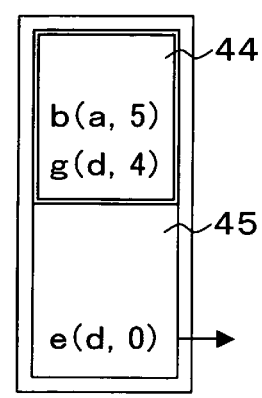
FIG. 11C 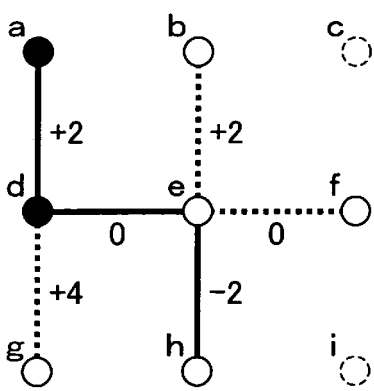 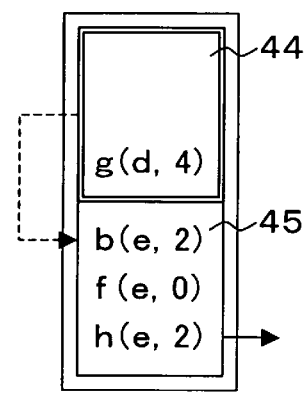

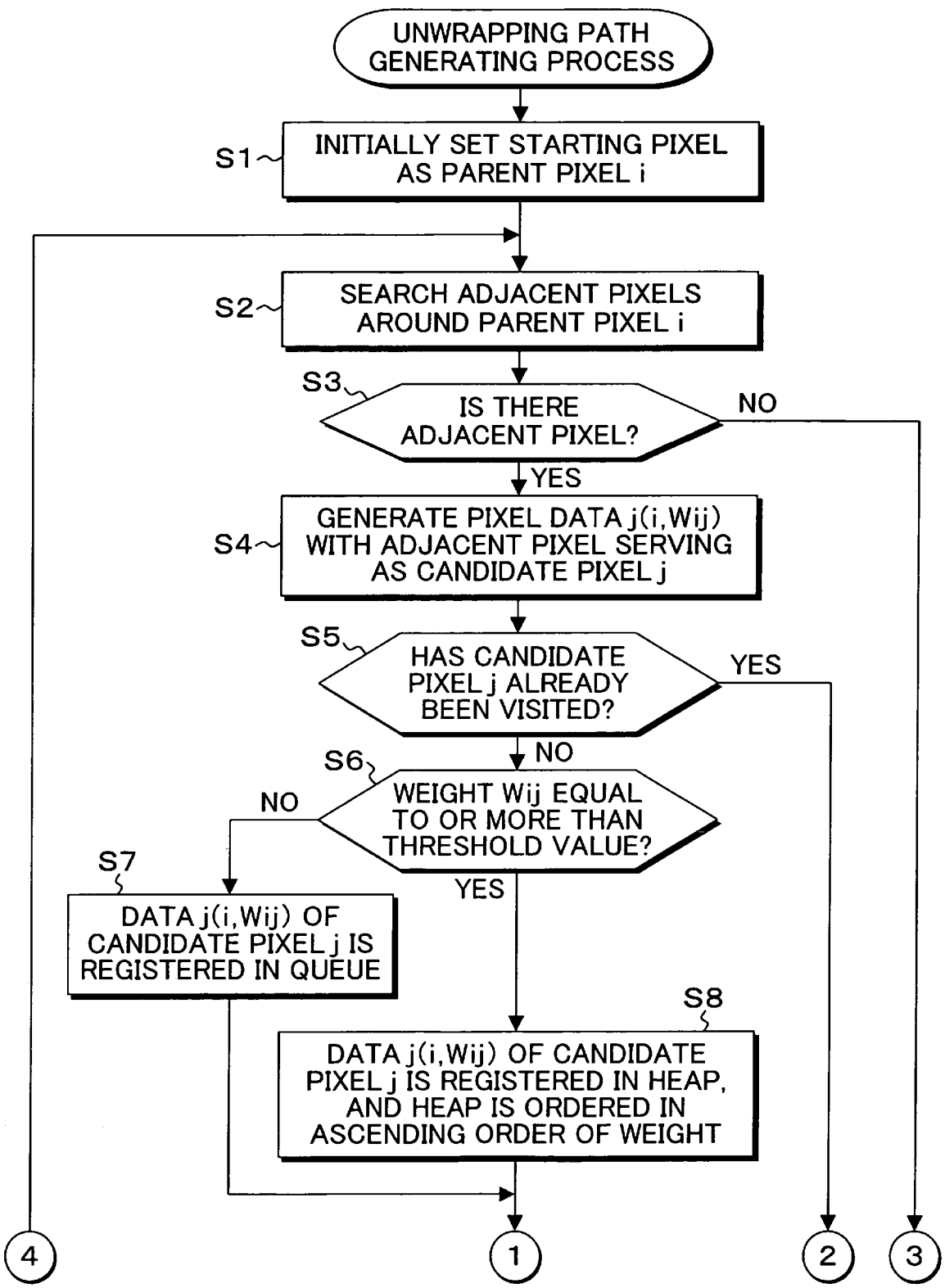

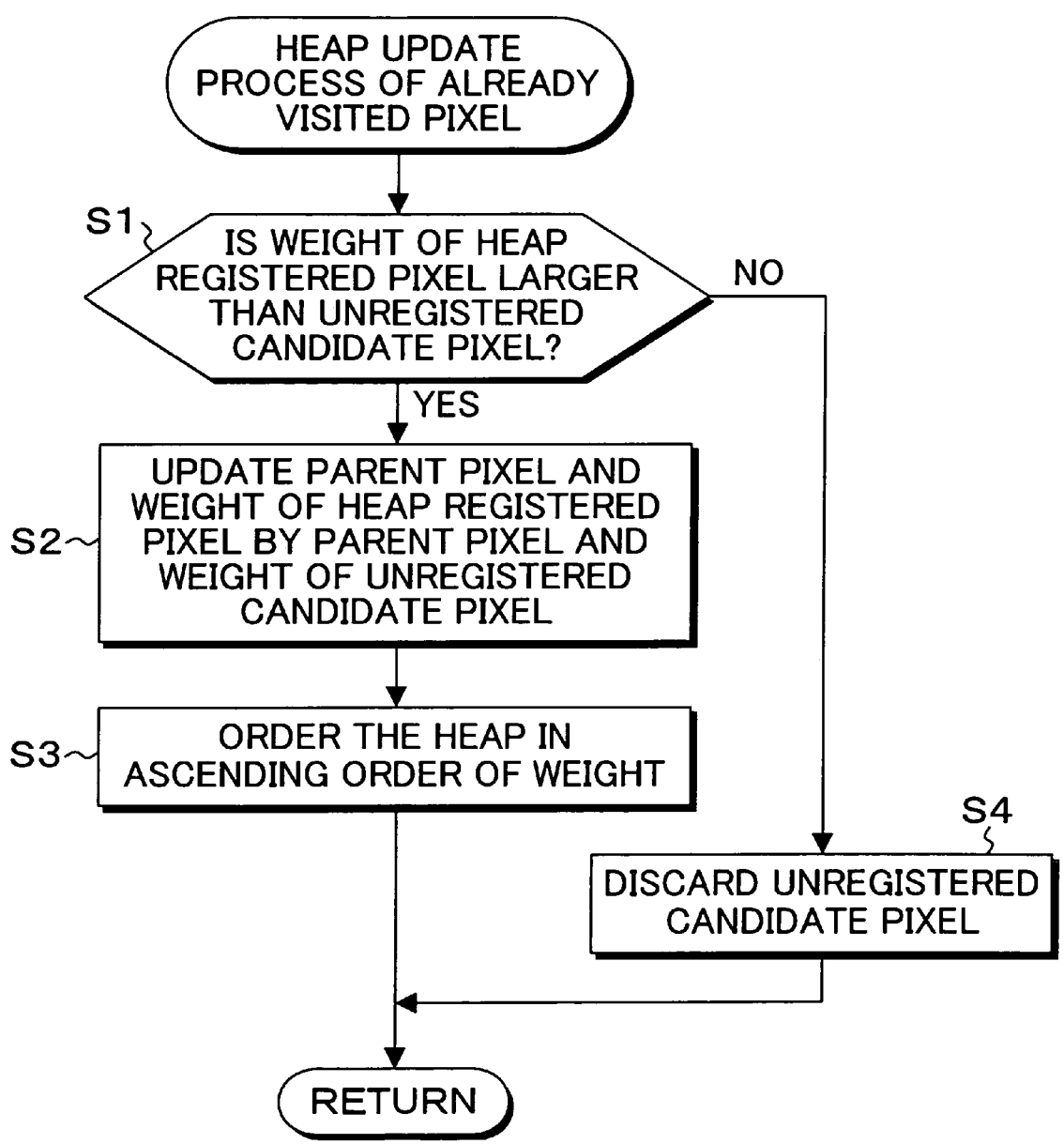

FIG. 20A 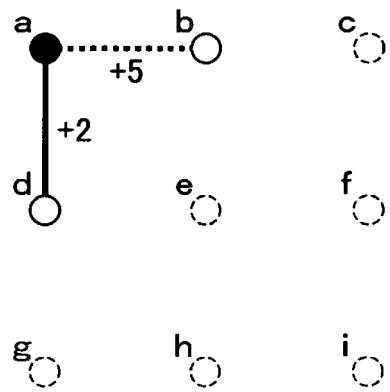 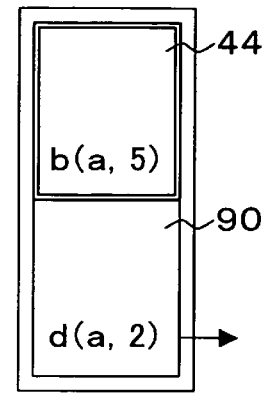
FIG. 20B 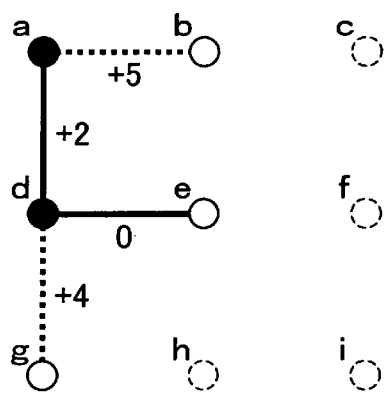 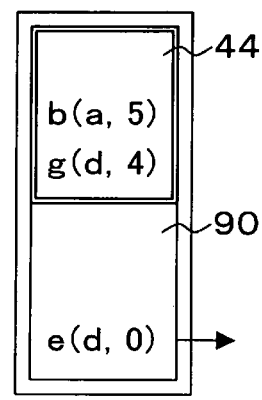
FIG. 20C 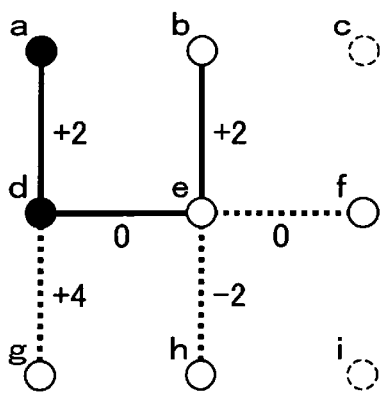 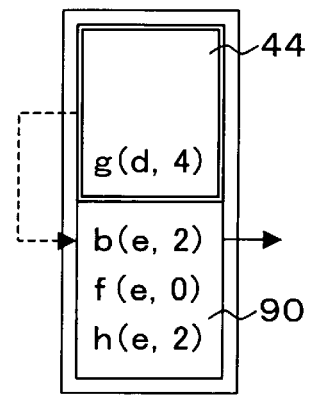

PHASE UNWRAPPING METHOD, PROGRAM, AND INTERFERENCE MEASUREMENT APPARATUS

This application is a priority based on prior application No. JP2005-332789, filed Nov. 17, 2005, in Japan.

BACKGROUND OF THE INVENTION

1. Field of the Invention

The present invention relates to a phase unwrapping method and program, and an interference measurement apparatus for obtaining heights from interference fringes of a measurement object, and particularly relates to a phase unwrapping method and program, and an interference measurement apparatus for determining an unwrapping path connecting pixels of phases which are unwrapped from a wrapping phase distribution based on an interference fringe image.

2. Description of the Related Arts

Conventionally, an interference measurement apparatus can measure the surface shape of a sample which is a measurement object with high precision. Therefore, it is utilized in, for example, quality inspection and quality control of various samples such as optical lenses and magnetic disks, semiconductor wafers, MEMS (Micro Electro Mechanical Systems).

FIG. 1 is a conventional interference measurement apparatus using a Michelson-type interference optical system. In FIG. 1, light having strong coherence emitted from a light source 100 is irradiated onto a sample 106 on a piezo-stage 104 and a reference mirror 108 by means of a half mirror 102. The light reflected from the sample 104 and the reference mirror 108 is overlapped again at the half mirror 102, thereby obtaining an interference fringe image. When the light intensity of an interference fringe is I(x,y), it can be represented by

[Expression 1]

$$I(x,y)=a(x,y)+b(x,y)\cos\{\phi(x,y)\} \quad (1).$$

Herein, a(x,y), b(x,y) are constants determined by the state of the optical system, and $\phi(x,y)$ is the phase at the position (x,y) of the interference fringe. Since the phase $\phi(x,y)$ and the height h(x,y) of the sample are related with each other according to the following expression (2), the height of the sample can be known by obtaining the phase of the interference fringe.

[Expression 2]

$$\phi(x,y) = \frac{4\pi}{\lambda} h(x,y) \quad (2)$$

Note that $\lambda$ is a light source wavelength.

As methods of eliminating influence of a(x,y), b(x,y) from the intensity information of the interference fringe of the expression (1) to obtain the phase $\phi(x,y)$ with high precision, for example, a phase shift method, a Fourier transform method, and a heterodyne method are known. However, in these methods, since the phase $\phi(x,y)$ is obtained as a function of an arctangent, the phase $\phi(x,y)$ is obtained in away that it is folded, i.e., wrapped into $-\pi$ to $\pi$ which is the range of the value of the arctangent.

For example, FIG. 2A shows an original phase 110 shown in one dimension wherein the distance is the horizontal axis, and FIG. 2B shows wrapped phases obtained from interference fringes. The process of obtaining a restored phase 114 through restoration from the wrapped phases as shown in FIG. 2B to the original phase as shown in FIG. 2C is called phase unwrapping or, merely, unwrapping.

FIG. 3 shows a phase map (phase distribution) two-dimensionally showing pixels which represent interference fringes, and each of the pixels has an unwrapped phase as pixel data. A phase unwrapping process of, for example, a case in which the phase of a pixel 124 which is at the distal end of an unwrapping path 122 is obtained based on a phase $\phi$s of a starting pixel 120 will be described. A restored phase $\Phi_E'$ of the pixel 124 can be obtained in the following manner by adding the phase differences from the pixel 120 to the pixel 124.

[Expression 3]

$$\phi_E' = \phi_S + \sum_P W_{ij} \quad (3)$$

Herein, $\phi_s$ is a phase at a pixel S, and $\phi_E'$ is a phase at a pixel E after unwrapping. Moreover, Wij is a phase difference in which phase skip due to wrapping between a pixel i and pixel j which are adjacent to each other along the unwrapping path 122 is corrected. The addition of the expression (3) is performed with respect to all of the adjacent pixels along the unwrapping path 122. In the corrected phase difference Wij of pixels before and after wrapping occurs like a pixel 112-2 and a pixel 112-3 of FIG. 2B, an error of $2\pi$ is generated compared with an original phase difference. Generally, in an unwrapping process, interference fringes are assumed to fulfill the Nyquist criterion (at least two or more pixels are sampled for at least one interference fringe frequency). When an interference fringe fulfills the Nyquist criterion, the phase difference between adjacent pixels is always equal to or less than $\pi$. Therefore, wrapping is determined to have occurred between pixels where the phase difference between the adjacent pixels is larger than $\pi$ (or smaller than $-\pi$), and the corrected phase difference Wij is calculated as shown in the following expressions by adding $-2\pi$ (or $+2\pi$) to the phase difference.

$$W_{ij} = \begin{cases} \phi_j - \phi_i & (-\pi < \phi_j - \phi_i \leq \pi) \\ \phi_j - \phi_i + 2\pi & (\phi_j - \phi_i \leq -\pi) \\ \phi_j - \phi_i - 2\pi & (\phi_j - \phi_i > \pi) \end{cases} \quad (4)$$

When a phase unwrapping process is to be performed according to such expression (3) and expressions (4), if the phase state is sufficiently smooth and continuous in the entire phase map region in FIG. 3, the phase $\phi_E'$ of the pixel 124 is supposed to be the same value regardless of the unwrapping path. However, in actual measurement, sometimes, the phase is steeply changed in addition to wrapped part due to spatial disturbance of the phase due to the surface state, dust, etc. on the sample, and phase inconsistency (phase non-continuity) is generated when the corrected phase difference is calculated. For example, when the phase difference between a pixel 112-4 and a pixel 112-5 of FIG. 2B is equal to or more than $\pi$, and the phase difference between the pixel 112-5 and a pixel 112-6 is equal to or less than $\pi$, $-2\pi$ is added upon calculation of the corrected phase difference between the pixel 112-4 and the pixel 112-5. As shown in the expression (3), the phase difference information of the previous path is added to the phase at the pixel position to be obtained; therefore, once inconsistency of the phase is generated, the error is superimposed on subsequent phases. For example, the error of $-2\pi$ which is added by mistake at the pixel 112-4 of FIG. 2B affects following phases.

Because of such reason, for example, when simple unwrapping paths 126-1 to 126-9 are set from the starting pixel 120 as shown in FIG. 4, there is a high possibility that the phase unwrapping process fails at paths 126-6 and 126-7 which are present after crossing hatched parts 128-2 and 128-3 where phase non-continuity may occur. As one method of selecting unwrapping paths which is tolerant to such phase non-continuity, the MST method in which a minimum spanning tree (Minimum Spanning Tree) in the phase map is selected as an unwrapping path is known (Authors, P. J. BRYANSTPN-CRPSS et al., Title: Application of the FFT method for the quantitative extraction of information from high-resolution interferometric and photpelastic data, Document Name: Optics & Laser Technology Vol. 26 No 31994; and Authors, Li An et al., Title: A Fast Implementation of the Minimum Spanning Tree method for Phase Unwrapping, Document Name: IEEE TRANSACTIONS ON MEDICAL IMAGING Vol. 19, NO. 8 AUG. 2000).

The MST method is known as one path problem in graph theory. When the method is utilized in an unwrapping process, as shown in FIG. 5, it is a method which selects, as unwrapping paths, the paths where the values of the magnitude $|Wij|$ of phase differences are added along the paths from the starting pixel 120 is the minimum. Moreover, in order to shorten the processing time of the phase unwrapping which is according to the MST method, a phase unwrapping method in which, when modulation products of interference fringes are out of a predetermined range, they are not stored in a storage list having an ordering function so as to perform path selection is also proposed (JP. 2003-42728).

However, such conventional unwrapping path selection according to the conventional MST method involves a problem that the process in path search takes time. In order to explain this problem, first, an example of simple unwrapping path generating procedures in which the phase difference Wij is not taken into consideration is shown in FIGS. 6A to 6C, and then, they are compared with path selection procedures of FIGS. 7A to 7C according to the MST method.

In FIGS. 6A to 6C, processes up to a third process among entire processes are shown as FIGS. 6A to 6C. In FIGS. 6A to 6C, a queue 130 which is a data structure not having the ordering function is used, and pixel data which is a candidate for determining an unwrapping path is shown in a data format of candidate pixel i (parent pixel j) and registered, wherein the pixel to be connected to the parent pixel i represents the candidate pixel j. Moreover, white circles of dotted lines are unvisited pixels, solid-line white circles are visited pixels (registered pixels), and black circles represent path-determined pixels. Furthermore, the lines connecting pixels to pixels are called sides, the sides shown by dotted lines represent sides which are currently registered in the queue 130, and the sides shown by solid lines represent the sides which have been determined as unwrapping paths. Hereinafter, details of the procedures will be sequentially described.

(First Procedure)

In a first procedure of FIG. 6A, around an unwrap starting pixel (a), for example, adjacent pixels (d) and (b) are searched in the order of bottom, right, top, and left, and, since they are unvisited pixels, pixel data "d(a)" and "b(a)" is generated and sequentially registered to the queue 130 as candidate pixels. When search of all the adjacent pixels is finished, the candidate pixel (d) which has been stored first among the candidate pixels registered in the queue 130 is retrieved and eliminated, and the side (d→a) connecting the retrieved candidate pixel (d) with the parent pixel (a) thereof is determined as an unwrapping path.

(Second Procedure)

In a second procedure of FIG. 6B, the pixel (d) which has been eliminated from the queue 130 in the first procedure is set as a parent pixel, pixels (g), (e), and (a) which are adjacent around the parent pixel (d) are sequentially searched, the unvisited pixels (g) and (e) are set as candidate pixels, and pixel data "g(d)" and "e(d)" are generated and registered sequentially in the queue 130. When search of all the adjacent pixels is finished, the candidate pixel (b) which has been stored first among the candidate pixels registered in the queue 130 is retrieved and eliminated, and the side (b→a) connecting the retrieved candidate pixel (b) with the parent pixel (a) thereof is determined as an unwrapping path.

(Third Procedure)

In a third procedure of FIG. 6C, the pixel (b) which has been eliminated from the queue 130 in the second procedure is set as a parent pixel, pixels (e), (c), and (a) which are adjacent around the parent pixel (b) are sequentially searched, the unvisited pixel (c) is set as a candidate pixel, and pixel data "c(b)" is generated and registered to the queue 130. When search of all the adjacent pixels is finished, the candidate pixel (g) which has been stored first among the candidate pixels registered in the queue 130 is retrieved and eliminated, and the side (g→d) connecting the retrieved candidate pixel (g) with the parent pixel (d) thereof is determined as an unwrapping path. Thereafter, paths are determined in similar procedures, and the process is finished when there is no more candidate pixel which is to be eliminated from the queue 130. When the unwrapping paths are determined in this manner, the phase differences Wij between the adjacent pixels on the paths are calculated from the expressions (4) and sequentially added according to the expression (3), thereby obtaining an unwrapped phase. In the path search problem of a graph, path search using a queue which is a data structure in which the pixel stored first is prioritized to be retrieved is called breadth-first search. Meanwhile, path search using a stack which is a data structure in which the pixel stored last is prioritized to be retrieved is known as depth-first search. Although such simple path search procedures are high speed, phase difference information is not taken into consideration at all; therefore, when there is non-continuity of phases, the possibility that phase unwrapping thereafter fails is high.

FIGS. 7A to 7C show unwrapping path generating procedures according to the MST method separately in first to third procedures of FIGS. 7A to 7C. In FIGS. 7A to 7C, a heap 132 is used as a data structure used in search of unwrapping paths. In the heap 132, when the candidate pixel j which is adjacent around the parent pixel i is searched, the phase difference Wij is obtained according to the correction calculation of the expressions (4), and data having a format of candidate pixel j (parent pixel i, weight $|Wij|$)

is generated and registered as pixel data of the candidate pixel j. Numerical values shown by the sides between the pixels are the phase differences Wij which have undergone the correction calculation, and $|Wij|$ which is the magnitude of the phase differences are used for magnitude determination when they are registered to the heap 132. Herein, in order to simplify the numerical values representing the phase differences, the phase range is standardized to a range of −5 to 5, and these are shown by the numerical values of the sides. The heap 132 is a data structure in which data is retained at nodal points of two trees, and the data of a parent is designed to be smaller than the data of two children, wherein, by using the weight |Wij| for determination of magnitude relations, a candidate pixel having the weight having the minimum value can be always ordered at a root position.

(First Procedure)

In a first procedure of FIG. 7A, a starting pixel (a) of phase unwrapping is set as a parent pixel, pixels (d) and (b) which are adjacent around the parent pixel (a) are sequentially searched, the unvisited pixels (d) and (b) are set as candidate pixels so as to generate pixel data of "d(a,2)" and "b(a,5)", and the generated candidate pixels are registered to the heap 132, such that the candidate pixel having the minimum weight is disposed at the lowest (root) position of the heap. When search of all the adjacent pixels is finished, the candidate pixel (d) which is registered at the bottom of the heap 132 and has the minimum weight is eliminated from the heap 132, and the side (side d→a) connecting the eliminated candidate pixel (d) with the parent pixel (a) thereof is determined as a phase unwrapping path.

(Second Procedure)

In a second procedure of FIG. 7B, the candidate pixel (d) eliminated from the heap 132 in the first procedure is set as a parent pixel, pixels (g), (e), and (a) which are adjacent around the parent pixel (d) are sequentially searched, the unvisited pixels (g) and (e) are set as candidate pixels so as to generate pixel data of "g(d,4)" and "e(d,0)", and the generated candidate pixels are registered to the heap 132, thereby ordering them such that the candidate pixel having the minimum weight is at the lowest position of the heap. When search of all the adjacent pixels is finished, the candidate pixel (e) which is registered at the bottom of the heap 132 and has the minimum weight is eliminated from the heap 132, and the side (side e→d) connecting the eliminated candidate pixel (e) with the parent pixel (d) is determined as a phase unwrapping path.

(Third Procedure)

In a third procedure of FIG. 7C the candidate pixel (e) which has been eliminated from the heap 132 in the second procedure is set as a parent pixel, and pixels (h), (f), (b), and (d) which are adjacent around the parent pixel (e) are sequentially searched, the unvisited pixels (h), (f), and (b) are set as candidate pixels so as to generate pixel data of "h(e, 2)", "(f(e,0)", and "b(e,3)", and they are registered to the heap 132 in the ascending order of the weight of the candidate pixels. However, regarding the candidate pixel (b), the pixel data "b(a,5)" of the same pixel (b) is registered in the heap 132 as shown in FIG. 7B; and, in order to avoid double registration of the same pixel, in this case, the pixel data of the registered candidate pixel (b) is rewritten to the smaller weight "3" and the parent pixel (e) thereof such that "b(e,3)" is set, and the rewritten candidate pixel is registered to the heap 132, thereby ordering them such that the candidate pixel having the minimum weight is at the lowest position of the heap. If the weight of the registered candidate pixel is larger, the same candidate pixel which is newly searched is discarded, and the registered pixel is caused to remain. When search of all the adjacent pixels is finished, the candidate pixel (f) which is registered at the bottom of the heap 132 and has the minimum weight is eliminated from the heap 132, and the side (side f→e) connecting the eliminated candidate pixel (f) with the parent pixel (e) thereof is determined as a phase unwrapping path. Thereafter, paths are determined in similar procedures, and the process is finished when there is no more data of the candidate pixels to be eliminated from the heap 132. When the unwrapping paths are determined in this manner, the unwrapped phases are sequentially obtained according to the expression (3) by use of the phase differences Wij between the adjacent pixels on the paths. In such path search process using the heap 132, the ordering process is performed such that the order of the candidate pixels constitute the heap, wherein the weights which are magnitude of the phase differences of all of the candidate pixels stored in the heap 132 serve as conversion keys; thus, it considerably takes processing time compared with the simple method of FIGS. 6A to 6C in which ordering is not performed. Generally, in the problem of obtaining a minimum spanning tree, since the pixel having the minimum weight, i.e., the pixel at the root position among the pixel data stored in the data structure at the point of time is required to be searched, the time required for ordering the data structure as a heap can be shortened; however, even when a heap is used, minimum rearranging processes of pixel data are required, and, when the number of pixels is increased like an unwrapping phase distribution obtained from interference fringes, the processing time due to the heap cannot be ignored. On the other hand, in Patent Document 3, although a storage list which is different from the heap and has an ordering function is disclosed, the operation of ordering is also generated in this method as well as the heap. Also, in Patent Document 3, when the modulation product of an interference fringe corresponding to the weight which is the phase difference is out of a predetermined range, it is not stored in the storage list having the ordering function so as to perform path selection; however, it is difficult to determine a "predetermined range appropriate for path selection" for a wrapped phase map, and, if normal pixel data is present in a range other than the predetermined range, paths including the normal pixel data out of the range and the paths continued from the pixels following them cannot be obtained. Moreover, Patent Document 3 discloses utilizing, in a region including many noises in the phase map, the storage list which requires ordering, and obtaining unwrapping paths in a region including not many noises through a simpler means; however, even in the region including not many noises, if even one crucial phase noncontinuity is present, following phase unwrapping fails. When this point is taken into consideration, all the pixel data having the possibility of noises are desired to be processed in a data structure having an ordering function. In addition, as is clear from the expression (1), the phase at a certain pixel requires the phase difference information in the paths before that. Therefore, when unwrapping paths are obtained independently in respective regions like in Patent Document 3, the phase relation between the regions become inconsistent. In such a case, in order to connect the unwrapping paths which are independent in respective regions, a process for achieving phase matching between the regions is additionally required; thus, separating the unwrapping path selection procedures respectively into the regions is not desirable also in terms of speed-up.

SUMMARY OF THE INVENTION

According to the present invention to provide a phase unwrapping method, program, and an interference measurement apparatus which can achieve both the avoiding ability of phase non-continuous regions and high-speed processing.

In order to achieve this object, the present invention is constituted in the following manner.

(Method)

The present invention provides a phase unwrapping method. More specifically, the present invention is a phase unwrapping method of generating a wrapping phase distribution in which pixels of wrapped phases are two-dimensionally disposed according to an interference fringe image of a measurement object, and determining an unwrapping path connecting pixels of unwrapped phases according to the wrapping phase distribution characterized by having a candidate pixel generating step of setting a starting pixel or a path-determined latest pixel as a parent pixel i, searching a path-undetermined adjacent pixel j which is adjacent around the parent pixel i, and generating, with respect to the searched adjacent pixel j, a candidate pixel having pixel data {j(i,|Wij|)} in which the parent pixel i and a weight |Wij| which is magnitude of a phase difference between the pixels which has undergone a correction calculation are combined;

a registration control step of, if the weight |Wij| of the candidate pixel is equal to or more than a predetermined threshold value TH, registering the pixel to a first data registration unit having a function of ordering the registration order and ordering the pixel based on the weight, and, if it is less than the threshold value TH, registering the pixel to a second data registration unit not having the function of ordering the registration order; and a path determination step of, every time the process in which all the adjacent pixel around the parent pixel is set as the candidate pixel is finished, retrieving and eliminating one candidate pixel in accordance with the registration order from the second data registration unit if the candidate pixels are present in the first data registration unit and the second data registration unit or if the candidate pixel is present merely in the second data registration unit, retrieving and eliminating the candidate pixel having an ordered minimum weight if the candidate pixel is present merely in the first data registration unit, determining a path between the eliminated candidate pixel and the parent pixel, and passing the eliminated pixel to the candidate pixel generating step as a next parent pixel.

Herein, in the registration control step, if the weight of the candidate pixel generated in the candidate pixel generating step is less than the threshold value, and the same candidate pixel is registered in the first data registration unit, the registered candidate pixel of the first data registration unit is moved to the second data registration unit, and the parent pixel is rewritten by the parent pixel of the candidate pixel generated in the candidate pixel generating step.

In the registration control step, if the weight of the candidate pixel generated in the candidate pixel generating step is equal to or more than the threshold value, and the candidate pixel which is same as the candidate pixel generated in the candidate pixel generating step is registered in the first registration unit; and if the weight of the registered candidate pixel is large, after the pixel is rewritten by the parent pixel and the weight of the candidate pixel generated in the candidate pixel generating step, the pixel is ordered, and if the weight of the registered candidate pixel is small, the candidate pixel generated in the candidate pixel generating step is discarded, and the registered candidate pixel is caused to remain.

In the registration control step, if the weight of the candidate pixel generated in the candidate pixel generating step is less than the threshold value, and the same candidate pixel is registered in the second data registration unit, the candidate pixel generated in the candidate pixel generating step is discarded, and the registered candidate pixel is caused to remain.

The first data registration unit is a heap. The second data registration unit is a queue having a first-in first-out function or a stack having a first-in last-out function.

Furthermore, a threshold value setting step of variably setting the threshold value used in the registration control step is provided. In the threshold value setting step, an optimal threshold value is determined based n variation information of phases of a phase distribution obtained from an interference fringe image of a predetermined sample.

In the threshold value setting step, with respect to the determined unwrapping path of the measurement object, a phase difference after unwrapping and a phase difference according to an unwrapping correction calculation are compared with each other with respect to adjacent pixels which are not the unwrapping path, and unwrapping failure is determined when the discrepant pixels exceed a predetermined number; and, when the number of times of unwrapping failure exceeds a predetermined number of times, the threshold value used for determination of the unwrapping path is lowered, and the process of determining an unwrapping path is retried.

(Program)

The present invention provides a phase unwrapping program. More specifically, the unwrapping program of the present invention is characterized by causing a computer of an interference measurement apparatus for generating a wrapping phase distribution in which pixels of wrapped phases are two-dimensionally disposed according to an interference fringe image of a measurement object, and determining an unwrapping path connecting pixels of unwrapped phases according to the wrapping phase distribution, to execute a candidate pixel generating step of setting a starting pixel or a path-determined latest pixel as a parent pixel i, searching a path-undetermined adjacent pixel j which is adjacent around the parent pixel i, and generating, with respect to the searched adjacent pixel j, a candidate pixel having data j(i, |Wij|) in which the parent pixel i and a weight which is magnitude of a phase difference Wij between the pixels which has undergone an unwrapping process are combined;

a registration control step of, if the weight |Wij| of the candidate pixel is equal to or more than a predetermined threshold value TH, registering the pixel to a first data registration unit having a function of ordering the registration order and ordering the pixel based on the weight, and, if it is less than the threshold value TH, registering the pixel to a second data registration unit not having the function of ordering the registration order; and a path determination step of, every time the process in which all the adjacent pixel around the parent pixel is set as the candidate pixel is finished, retrieving and eliminating one candidate pixel in accordance with the registration order from the second data registration unit if the candidate pixels are present in the first data registration unit and the second data registration unit or if the candidate pixel is present merely in the second data registration unit, retrieving and eliminating the candidate pixel having an ordered minimum weight if the candidate pixel is present merely in the first data registration unit, determining a path between the eliminated candidate pixel and the parent pixel, and passing the eliminated pixel to the candidate pixel generating step as a next parent pixel.

(Apparatus)

The present invention provides an interference measurement apparatus. More specifically, the present invention is an interference measurement apparatus for generating a wrapping phase distribution in which pixels of wrapped phases are two-dimensionally disposed according to an interference fringe image of a measurement object, and determining an unwrapping path connecting pixels of unwrapped phases according to the wrapping phase distribution; characterized by having a first data registration unit having a function of ordering the registration order of registered information;

a second data registration unit not having the function of ordering the registration order of registered information;

a candidate pixel generating unit for setting a starting pixel or a path-determined latest pixel as a parent pixel i, searching a path-undetermined adjacent pixel j which is adjacent around the parent pixel i, and generating, with respect to the searched adjacent pixel j, a candidate pixel having data j(i, |Wij|) in which the parent pixel i and a weight which is magnitude of a phase difference Wij between the pixels which has undergone an unwrapping process are combined;

a registration control unit for, if the weight |Wij| of the candidate pixel is equal to or more than a predetermined threshold value TH, registering the pixel to the first data registration unit and ordering the pixel based on the weight, and, if it is less than the threshold value TH, registering the pixel to the second data registration unit; and a path determination unit for, every time the process in which all the adjacent pixel around the parent pixel is set as the candidate pixel is finished, retrieving and eliminating one candidate pixel in accordance with the registration order from the second data registration unit if the candidate pixels are present in the first data registration unit and the second data registration unit or if the candidate pixel is present merely in the second data registration unit, retrieving and eliminating the candidate pixel having an ordered minimum weight if the candidate pixel is present merely in the first data registration unit, determining a path between the eliminated candidate pixel and the parent pixel, and passing the eliminated pixel to the candidate pixel generating unit as a next parent pixel.

It should be noted that details of the phase unwrapping program and the interference measurement apparatus according to the present invention are basically same as the phase unwrapping method according to the present invention.

According to the present invention, the weight which is the magnitude of the phase difference between the wrapping pixels is compared with the threshold value, it is registered to the heap which is a data structure having the ordering function if the weight is larger, and path determination of the pixels having the possibility of non-continuous region is gathered to the end of the path search process, thereby avoiding failure of unwrapping caused when paths pass through non-continuous regions in the middle thereof. If the weight is smaller meanwhile, it is registered to the queue which is a data structure not having the ordering function or a stack, and an unwrapping path is determined through a simple process of retrieving the oldest pixel or the latest pixel, thereby shortening the processing time. Particularly, by setting the threshold value, which is for determining the magnitude of the weight for allocating the pixels to the data structure having the ordering function and the data structure not having it, to an optimal value, for example, the ratio of the pixels for determining paths by the data structure having the ordering function can be suppressed to about 1 percent of the entirety; consequently, phase unwrapping can be performed by the time about ¼ that of the conventional MST method. The above and other objects, features, and advantages of the present invention will become more apparent from the following detailed description with reference to the drawings.

BRIEF DESCRIPTION OF THE DRAWINGS

FIG. 5 is an explanatory diagram of an unwrapping path according to an MST method in which phase differences between pixels are taken into consideration;

FIGS. 6A to 6C are explanatory diagrams of a conventional simple unwrapping path generation procedures;

FIGS. 7A to 7C are explanatory diagrams of unwrapping path generation procedures according to the conventional MST method;

FIGS. 11A to 11C are explanatory diagrams of unwrapping path generating procedures according to the present invention;

FIGS. 15A and 15B are flow charts of the unwrapping path generating process of step S4 of FIG. 14;

FIG. 16 is a flow chart of a heap update process of the visited pixel of step S10 of FIGS. 15A and 15B;

FIGS. 20A to 20C are explanatory diagrams of unwrapping path generating procedures according to the present invention when a stack is used as a second data registration unit.

DETAILED DESCRIPTION OF THE PREFERRED EMBODIMENTS

Figure 1:
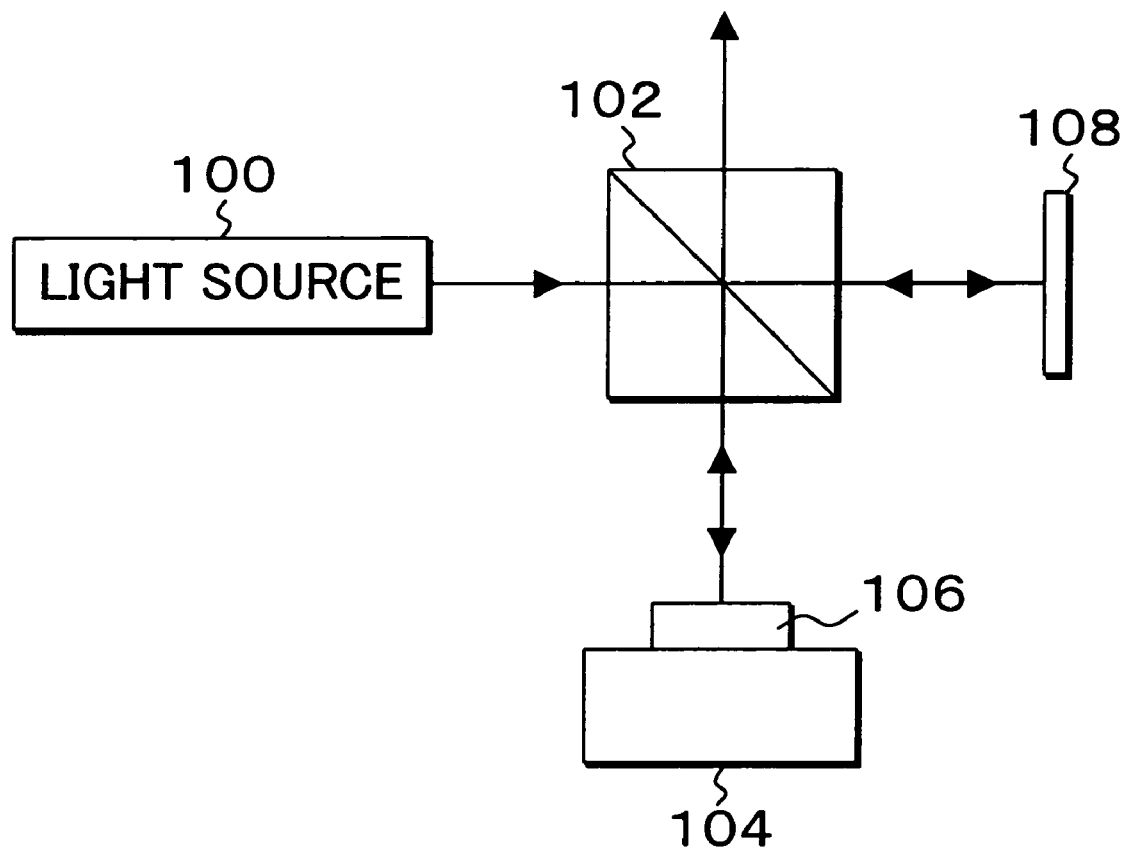
FIG. 1 is an explanatory diagram of a conventional Michelson-type interference optical system.
Figure 2:
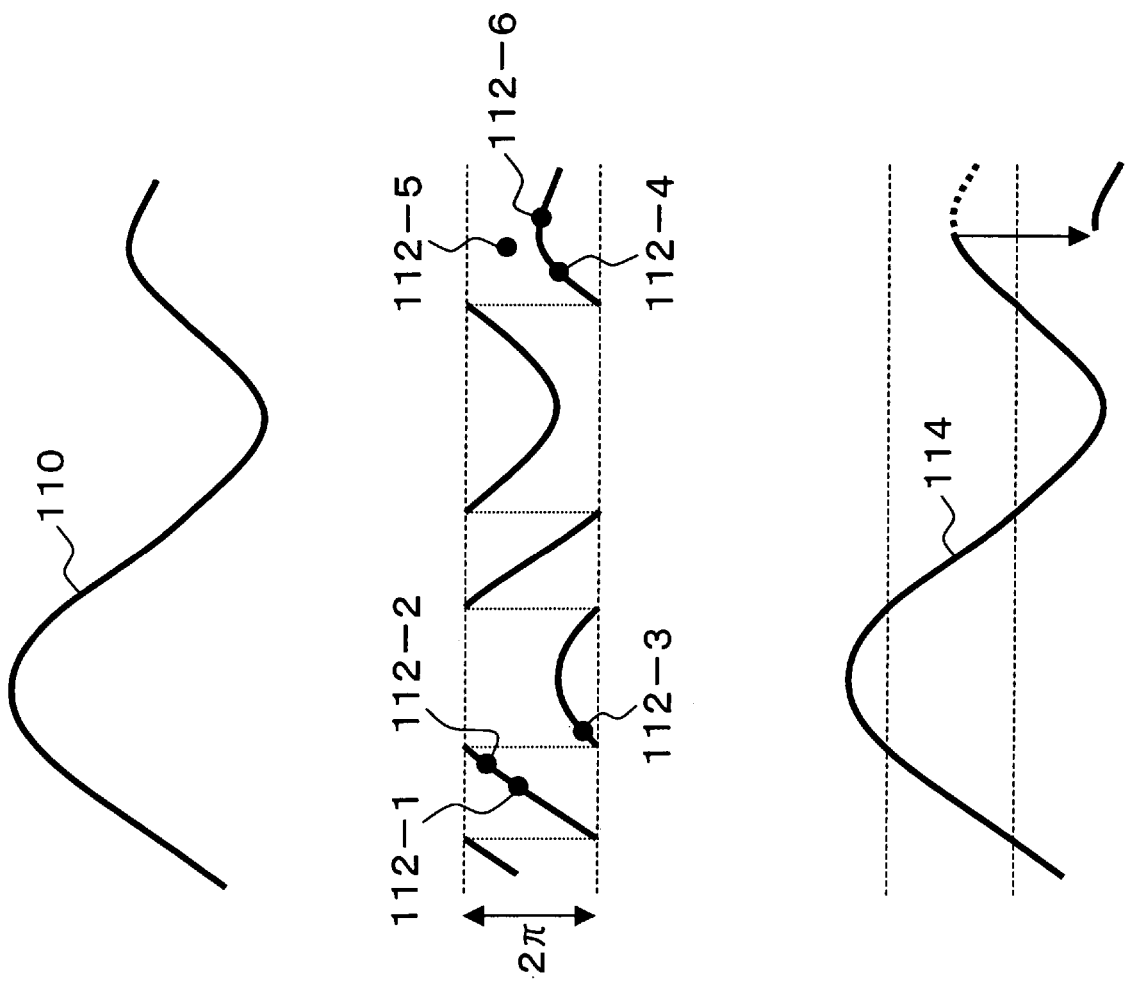
FIGS. 2A to 2C are explanatory diagrams of phase unwrapping for an interference fringe image.
Figure 3:
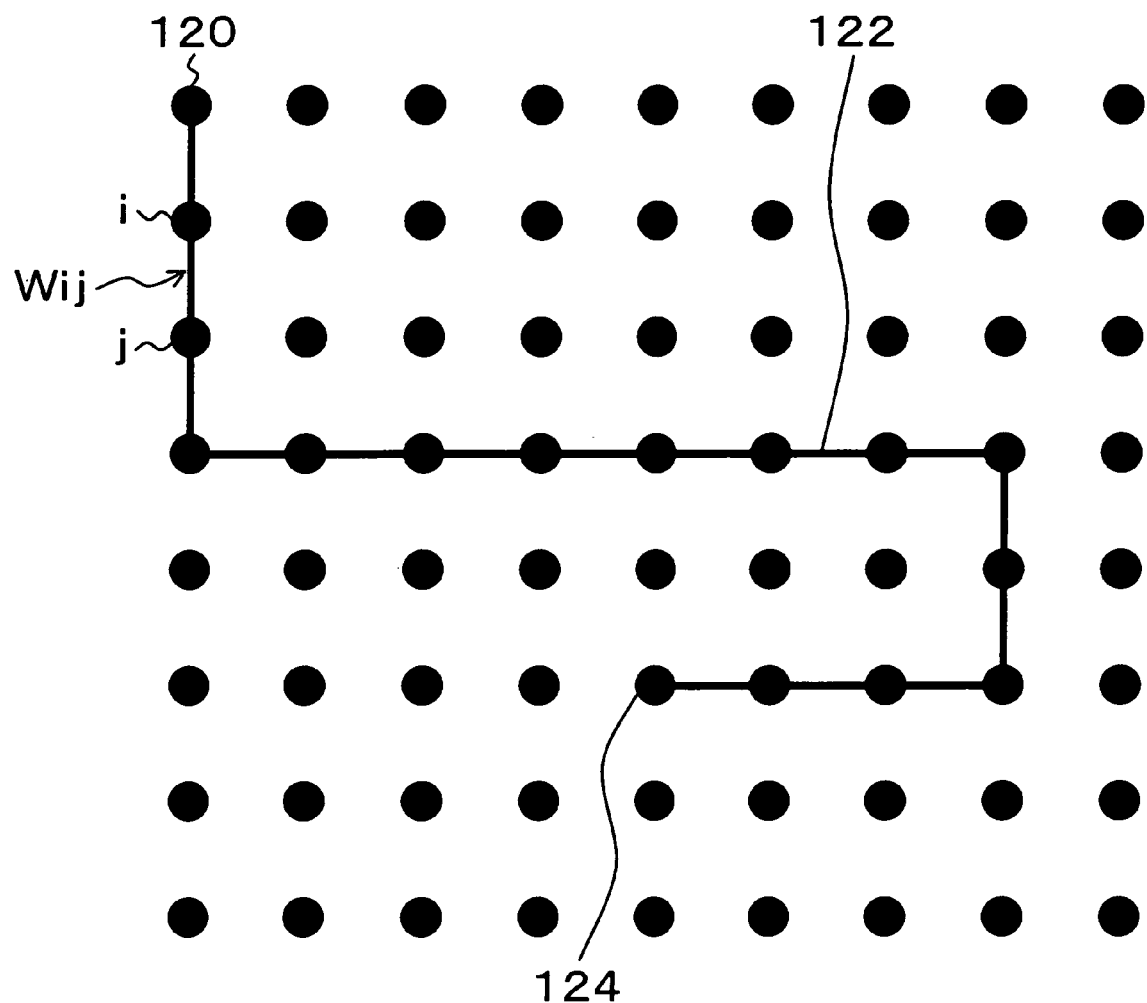
FIG. 3 is an explanatory diagram of an unwrapping path according to conventional simple path search in which phase differences between pixels are not taken into consideration.
Figure 4:
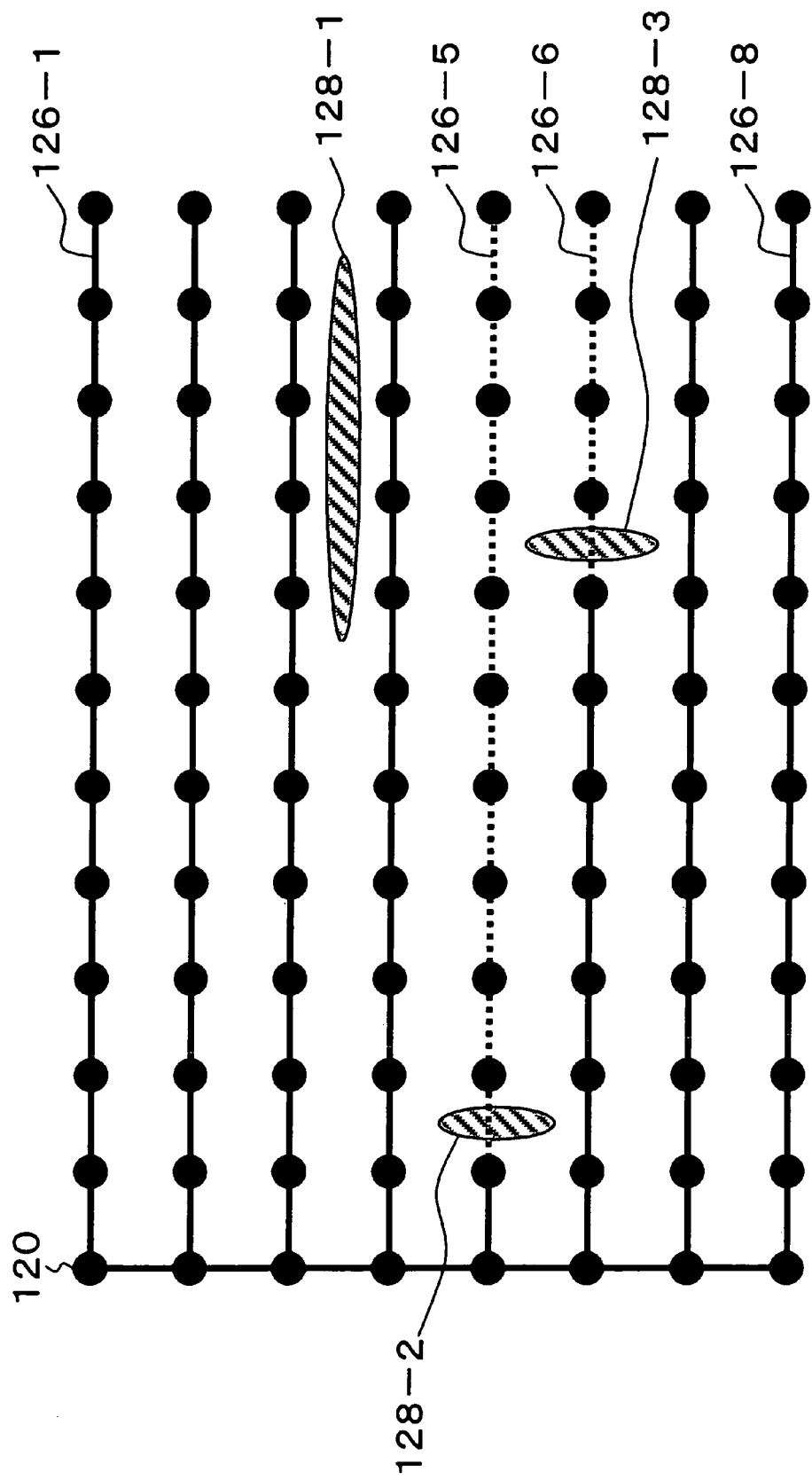
FIG. 4 is an explanatory diagram of a conventional unwrapping path which fails due to presence of phase non-continuous regions.
Figure 8:
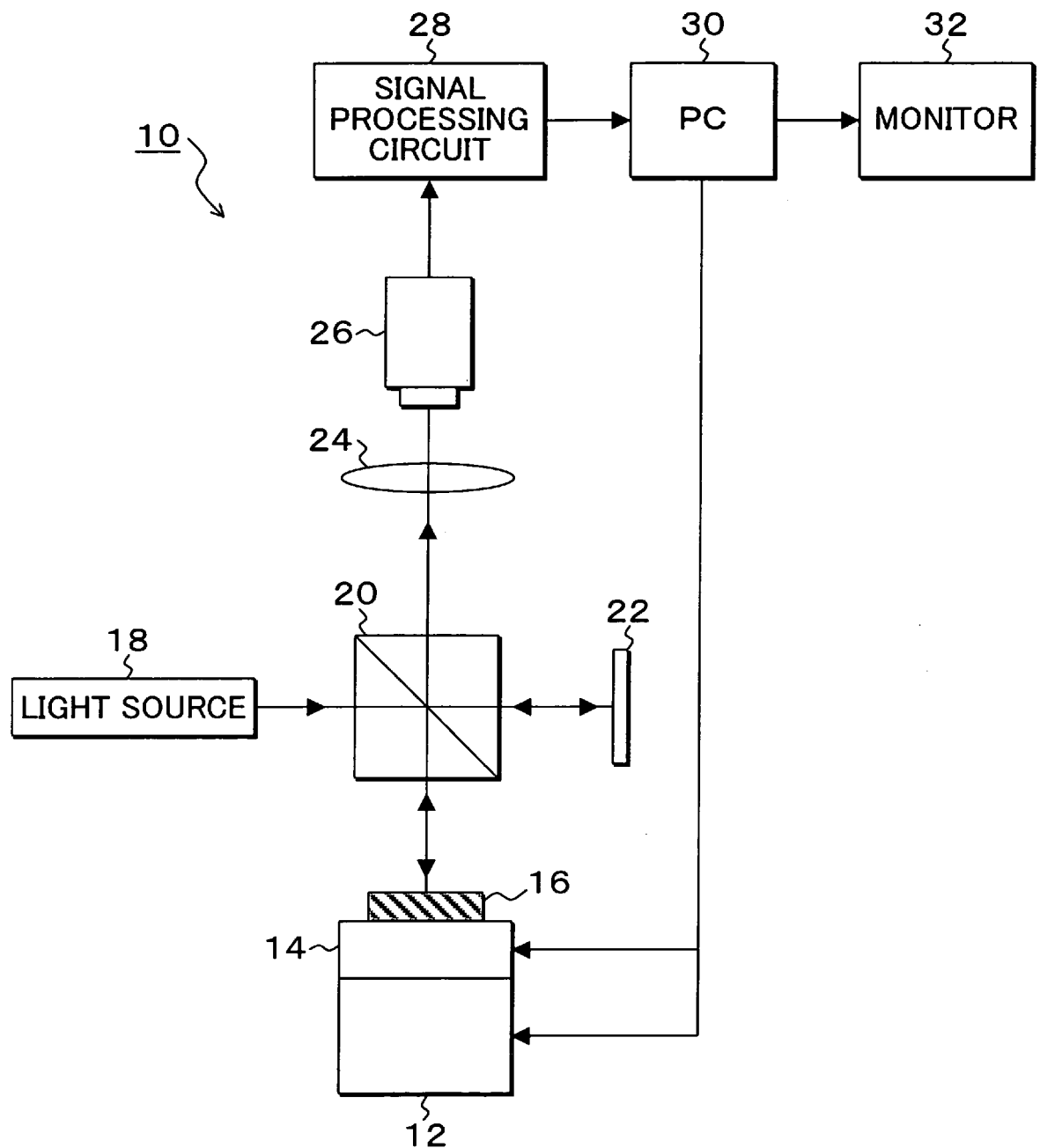
FIG. 8 is an explanatory diagram showing an embodiment of an interference measurement apparatus according to the present invention.

FIG. 8 is an explanatory diagram showing an embodiment of an interference measurement apparatus according to the present invention. In FIG. 8, the interference measurement apparatus 10 of this embodiment is comprised of a stage 12 for controlling sample position/posture, a piezo-stage 14, a sample 16, a light source 18 such as a laser having good coherence, a half mirror 20, a reference mirror 22, an imaging lens 24, a CCD camera 26, a signal processing circuit 28, a personal computer 30, and a monitor 32. The interference optical system divides inspection light, which has been emitted from the light source 18 such as a laser having good coherence, by the half mirror 20 into that for the sample 16 and that for the reference mirror 22, and, at the CCD camera 26 via the imaging lens 24, forms an image of interference fringes wherein the light reflected from the sample 16 and the reference mirror 22 is overlapped with each other again to achieve interference by the half mirror 20, thereby taking an image. The stage 12 for controlling sample position/posture controls the position and posture of the sample 16. The piezo-stage 14 is used for performing phase measurement according to a phase shift method while minutely moving the position of the sample 16. An imaging signal of the interference fringes obtained by overlapping of the light reflected from the sample 16 of which image has been taken by the CCD camera 26 and the reference mirror 22 is imported into the personal computer 30 via the signal processing circuit 28. In the personal computer 30, a wrapped phase map (phase distribution) is obtained from the interference fringe image signal, for example, according to the phase shift method, the original phase map is obtained by performing a phase unwrapping process on the unwrapping phase mapping, and the phase map information, i.e., the minute shape of the sample 16 is displayed in the monitor 32.

Figure 9:
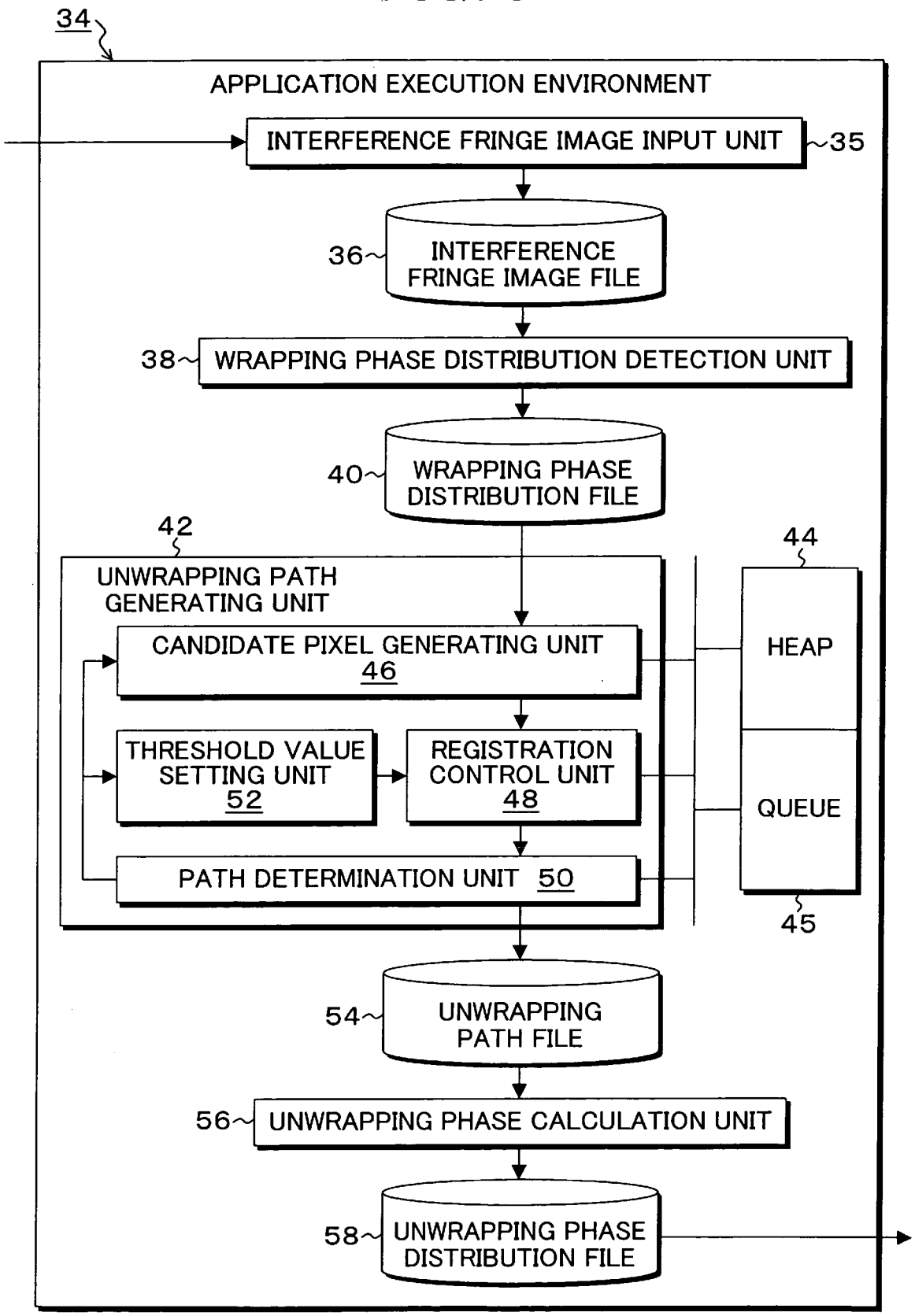
FIG. 9 is a block diagram of the function configuration of an unwrapping process according to the present invention.

FIG. 9 is a block diagram of the function configuration of an unwrapping process according to the present invention. In FIG. 9, an application execution environment 34 is brought about by an OS in the personal computer 30 of FIG. 8. In the application execution environment 34, as functions which are realized by execution of a program for realizing the unwrapping process of the present invention, an interference fringe image input unit 35, an interference fringe image file 36, a wrapping phase distribution detection unit 38, a wrapping phase distribution file 40, an unwrapping path generating unit 42, a heap 44, a queue 45, an unwrapping path file 54, an unwrapping phase calculation unit 56, and an unwrapping phase distribution file 58 are provided. The interference fringe image input unit 35 stores, in the interference image file 36, image data of the interference fringe image obtained by overlapping of the light reflected from the sample 16 of which image has been taken by the CCD camera 26 of FIG. 8 with the light reflected from the reference mirror 22, specifically, image data serving as information of pixels two-dimensionally disposed in an imaging screen. The wrapping phase distribution detection unit 38 obtains, from the interference fringe image stored in the interference fringe image file 36, for example, according to the phase shift method, wrapping phase distribution in which the phase is wrapped to $-\pi$ to $\pi$ which is the range of the value of an arc tangent, and stores this in the wrapping phase distribution file 40. In the unwrapping path generating unit 42, a candidate pixel generating unit 46, a registration control unit 48, a path determination unit 50, and a threshold value setting unit 52 are provided. Moreover, in the unwrapping path generating unit 42, as a data structure used for generating an unwrapping path, the heap 44 which functions as a first data registration unit having a function of ordering the registration order of registered information and the queue 45 which functions as a second data registration unit not having the function of ordering the registration order of registered information are provided. With respect to two-dimensionally disposed pixel data having a unique phase imparted as wrapping phase distribution, the candidate pixel generating unit 46 sets a starting pixel or a path-determined latest pixel as a parent pixel i, searches a path-undetermined adjacent pixel j which is adjacent around the parent pixel i, calculates a corrected phase difference Wij between the pixels of the searched adjacent pixel j and the parent pixel i by means of above described expressions (4), calculates a weight |Wij|, and generates pixel data $$\{j(i,|W_{ij}|)\}$$

which is in the form of a combination of them. The magnitude |Wij| of the phase difference Wij which is contained in the pixel data and has been subjected to a correction calculation according to the expressions (4) is used as a weight when it is to be ordered by determining the magnitude relation thereof upon registration to the heap 44; therefore, the magnitude |Wij| of the phase difference Wij will be referred to as a weight in the below description. The registration control unit 48 compares the weight |Wij| of the candidate pixel j which has been generated in the candidate pixel generating unit 46 with a predetermined threshold value TH which has been set by the threshold value setting unit 52; and, when it is equal to or more than the threshold value TH, registers it to the heap 44 having a function of ordering the registration order so as to perform ordering such that a candidate pixel having the minimum weight is at the lowest position in the heap, and, when it is less than the threshold value TH, registers it to the queue 45 not having the function of ordering the registration order. The path determination unit 50 executes a process for determining a path in which the queue 45 not having the ordering function is prioritized. More specifically, every time a process in which all adjacent pixels around a certain parent pixel i are set as candidate pixels is completed by the candidate image generating unit 46 and the registration control unit 48, when candidate pixels are present in both the heap 44 and the queue 45 or when a candidate pixel(s) is present merely in the queue 45, a candidate pixel corresponding to the registration order, i.e., the oldest registered pixel is retrieved from the queue 45 and eliminated, and a path between the eliminated candidate pixel and the parent pixel is determined. Furthermore, when the path is determined, the eliminated pixel is passed to the candidate pixel generating unit 46 as a next parent pixel, so as to perform next path generation. Meanwhile, when no candidate pixel is present in the queue 45, and a candidate pixel(s) is present merely in the heap 44, a candidate pixel having the minimum ordered weight is retrieved and eliminated, a path between the eliminated candidate pixel and the parent pixel is determined, and the eliminated pixel is passed to the candidate pixel generating unit 46 as a next parent pixel. As described above, in registration of pixel data to the heap 44 and the queue 45 in the unwrapping path generating unit 42 of the present invention, the queue 45 not having the ordering function is prioritized. As long as there is a candidate pixel(s) in the queue 45, the candidate pixel is retrieved from the queue 45 to determine a path, and, only when there is no more candidate pixel in the queue 45, a candidate pixel(s) of the heap 44 is retrieved in the ascending order of the weight to determine a path. Whether it is to be stored in the heap 44 or to be stored in the queue 45 is determined by the value of the threshold value TH according to the threshold value setting unit 52. Therefore, when the threshold value TH is optimized, a pixel(s) having an abnormal phase such as that across a phase non-continuous region is stored and remains to the end in the heap 44. Thus, the situation in which a path passes through a phase non-continuous region during generation of the path can be prevented. At the same time, by largely increasing the ratio of the pixels to be stored in the queue 45, the processing time required for path search in whole can be shortened. This process performed by the unwrapping path generating unit 42 will be described in detail in below description separately in specific procedures. When path generation is completed in the unwrapping path generating unit 42, the determined unwrapping path is stored in the unwrapping path file 54. With respect to the determined unwrapping path of the unwrapping path file 54, the unwrapping phase calculation unit 56 sequentially performs the addition calculation of phase differences of the above described expression (3) from the starting pixel to the last pixel of the path along the path by use of the correction-calculation-subjected phase differences Wij between the pixels which have already been calculated in the unwrapping path generating process, thereby converting wrapping phases of all the pixels into an unwrapped phase, and stores it in the unwrapping phase distribution file 58. The result of the unwrapping phase distribution file 58 is read and displayed in the monitor 32 as shown in FIG. 8.

Figure 10:
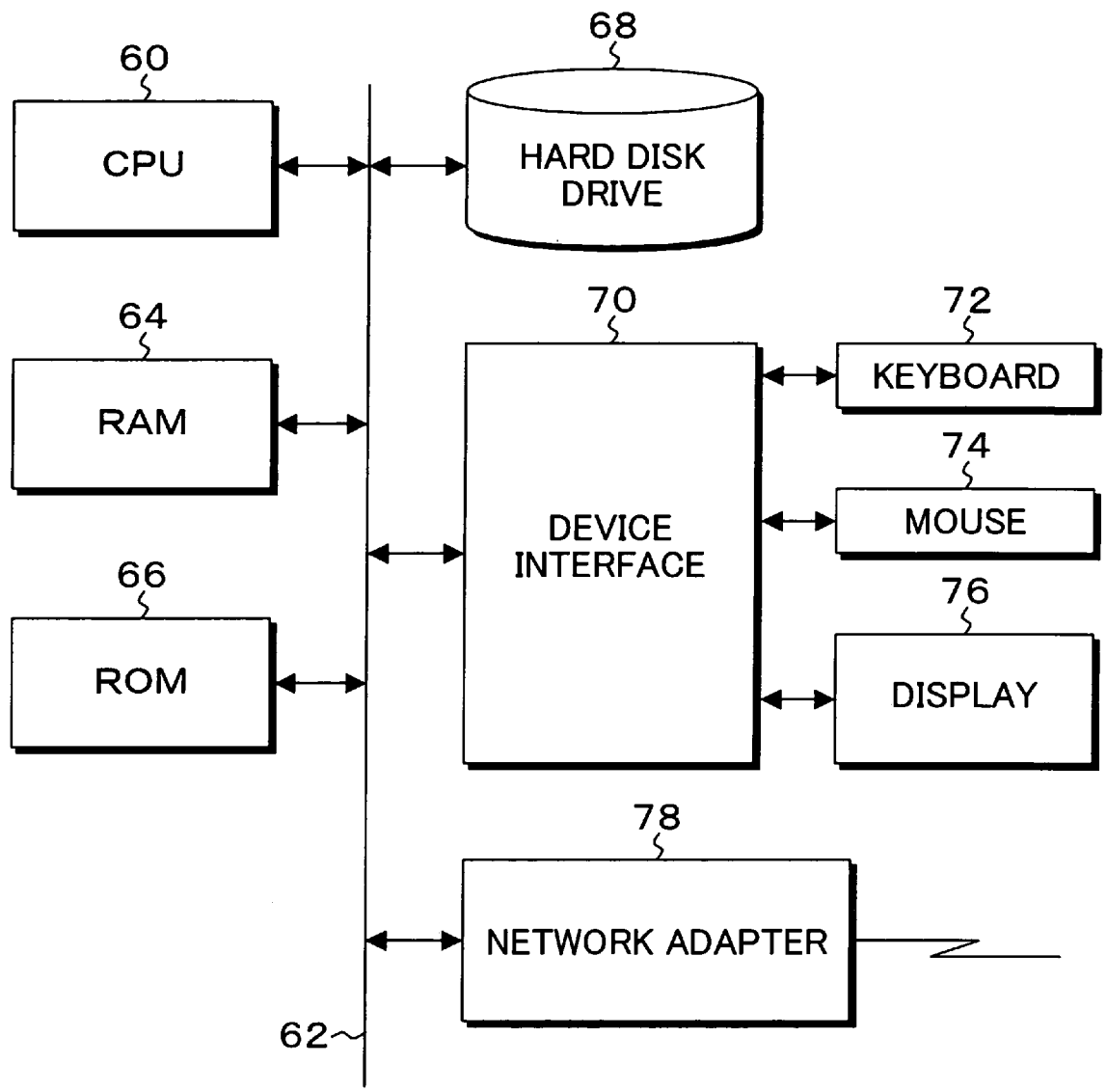
FIG. 10 is a block diagram of a hardware environment of a computer which realizes the function configuration of FIG. 9.

FIG. 10 is a block diagram of a hardware environment of the personal computer 30 shown in FIG. 8 which realizes the unwrapping process of FIG. 9. In FIG. 10, to a bus 62 from a CPU 60 connected are, for example, a RAM 64; a ROM 66; a hard disk drive 68; a device interface 70 connecting a keyboard 72, a mouse 74, and a display 76; and a network adapter 78. An application program for executing the unwrapping process of the present invention is stored in the hard disk drive 68. The program is read from the hard disk drive 68 to the RAM 64 when the computer is started up, and executed by the CPU 60.

FIGS. 11A to 11C are explanatory diagrams of the unwrapping path generating procedures according to the present invention, wherein FIGS. 11A to 11C separately show first procedure to third procedure. In FIGS. 11A to 11C, pixels of white circles are unvisited pixels, pixels of solid-line white circles are visited pixels (visited pixels), and black circles represent path-determined pixels. Moreover, the lines connecting pixels to pixels are called sides, the sides shown by dotted lines are sides which are currently registered in the heap 44 or the queue 45, and the sides shown by solid lines represent the sides which have been determined as an unwrapping path. When a parent pixel is i, and an adjacent unvisited pixel searched around the parent pixel i is a candidate pixel j in the pixel data stored in the heap 44 or the queue 45, the phase difference Wij between the parent pixel i and the candidate pixel j is obtained by the correction calculation of the expressions (4), and the pixel data having a data format of {candidate pixel j (parent pixel i, weight |Wij|)} as pixel data of the candidate pixel j is generated and registered. Numerical values shown by the sides between the pixels are phase differences Wij which have been subjected to the correction calculation, and |Wij| which is the magnitude of each phase difference is used for determination of magnitude when it is registered to the heap 44. The heap 44 generally has a data structure which is designed such that data is retained at each connecting point of two trees, and data of a parent is smaller than data of two children; wherein, by using the weight |Wij| for determination of magnitude relations, a candidate pixel having the smallest weight can be always ordered at a root position. In FIGS. 11A to 11C, the lowest position of the heap 44 is the ordered position of the candidate pixel having the minimum value of the weight.

(First Procedure)

In the first procedure of FIG. 11A, a starting pixel (a) of phase unwrapping is set as a parent pixel, pixels (d), (b) are sequentially searched as adjacent pixels, for example, counterclockwise from bottom, right, top, to left around the parent pixel a, the unvisited pixels (d), (b) are set as candidate pixels, and pixel data of each of them "d(a,2)"

"b(a,5)"

is generated. Then, the weights of the candidate pixels (d), (b) are compared with the predetermined threshold value TH. In this example, the threshold value TH=3. With respect to the candidate pixel d, since the weight=2 which is less than the threshold value TH=3, the pixel data d (a,2) thereof is stored in the queue 45. With respect to the candidate pixel b, since the weight=5 which is above the threshold value TH=3, it is stored in the heap 44 such that the candidate pixel having the minimum weight is ordered to be at the lowest position of the heap. Then, since the candidate pixels (b) and (d) are registered in both the heap 44 and the queue 45, the queue 45 is prioritized in this case, the pixel data of the candidate pixel (d) which is the oldest data in the queue 45 is eliminated, and the side (d→a) connecting the eliminated candidate pixel (d) with the parent pixel (a) is determined as a phase unwrapping path.

(Second Procedure)

In the second procedure of FIG. 11B, the candidate pixel (d) which has been eliminated from the queue 45 in the first procedure is set as a parent pixel, adjacent pixels (g), (e), and (a) are sequentially searched around the parent pixel (d), the unvisited pixels (g) and (e) are set as candidate pixels, and pixel data of "g(d,4)" and "e(d,0)"

is generated. Then, the pixel data of the candidate pixel (g) having a weight=4 which is large with respect to the threshold value TH=3, is registered in the heap 44 such that the candidate pixel having the minimum weight is ordered to be at the lowest position of the heap, and the pixel data of the candidate pixel (e) having a weight=0 which is smaller than the threshold value TH=3 is registered in the queue 45.

Subsequently, the queue 45 is prioritized since the candidate pixels are registered in both the heap 44 and the queue 45 at this point, the pixel data of the candidate pixel (e) which is the oldest registered data is retrieved from the queue 45 and eliminated, and the side (e→d) connecting the eliminated candidate pixel (e) with the parent pixel (d) thereof is determined as a phase unwrapping path.

(Third Procedure)

In the third procedure of FIG. 11C, the candidate pixel (e) which has been eliminated from the queue 45 in the second procedure is set as a parent pixel, adjacent pixels (h), (f), (b), and (d) around the parent pixel (e) are sequentially searched, the unvisited pixels (h), (f), and (b) are set as candidate pixels, and pixel data "h(e,2)", "f(e,0)", and "b(e,2)" thereof is generated. Then, the candidate pixels (h) and (f) having weights less than the threshold value TH=3 are sequentially registered in the queue 45. Meanwhile, the candidate pixel b has already been registered as pixel data "b(a,5)" in the heap 44 in the process of the first procedure of FIG. 11A. In order to avoid double registration of the same pixel, in this case, the pixel data "b(a,5)" of the pixel (b) which has already been registered in the heap 44 is moved to the queue 45 as shown by a dotted-line arrow 75. Then, based on newly generated pixel data "b(e,2)" of the candidate pixel (b), the parent pixel is rewritten such that "a→e", and the weight is also rewritten such that "5→2". Thereafter, the path is determined according to similar procedures, and the process is finished at the point when there is no more pixel data of candidate pixels in the queue 45 and the heap 44.

Figure 12:
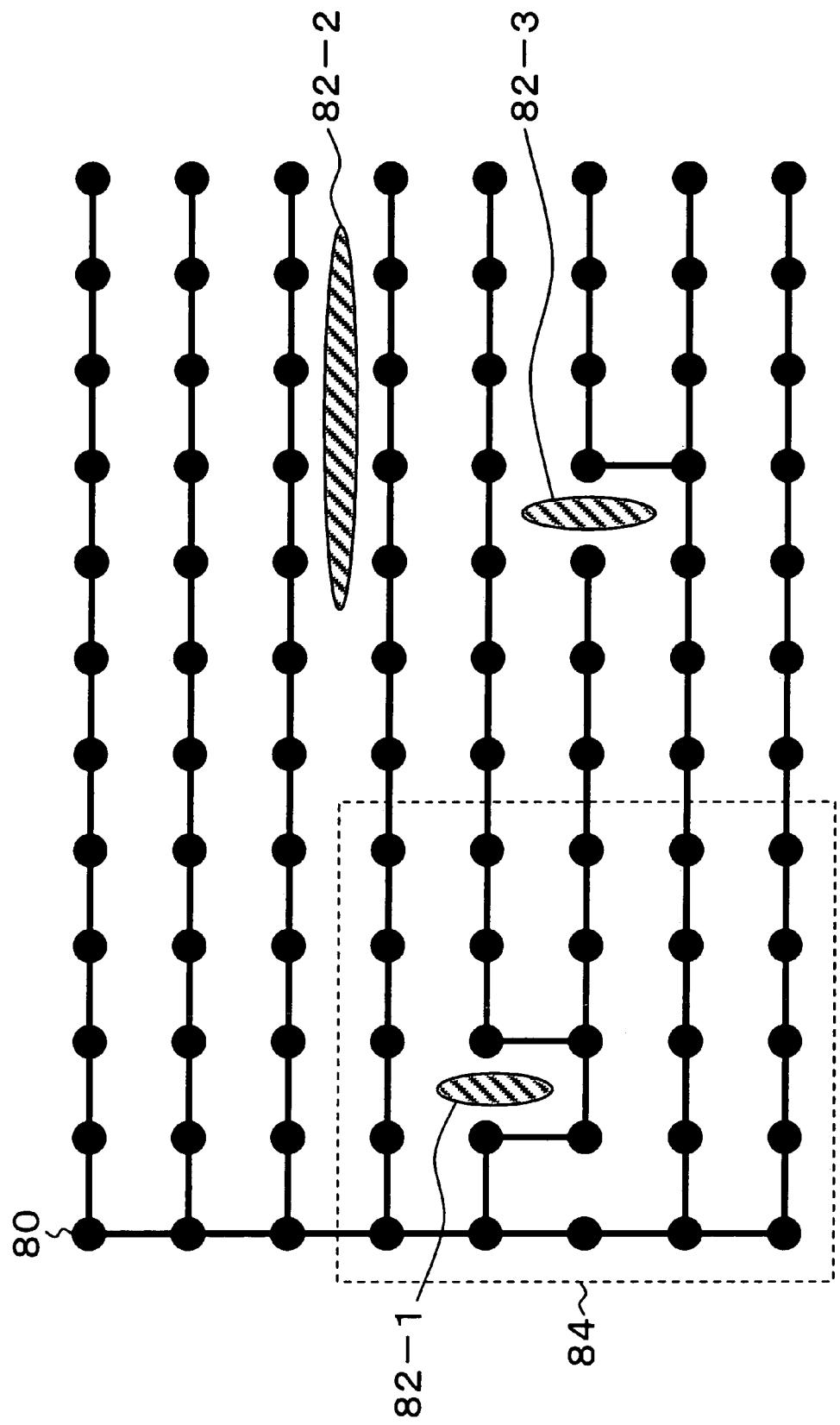
FIG. 12 is an explanatory diagram of an unwrapping path which is generated according to the present invention.
Figure 13A:
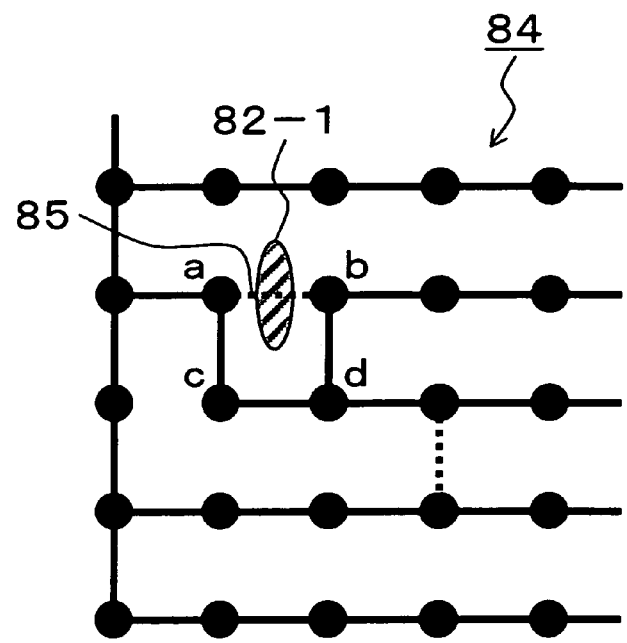
FIGS. 13A and 13B are explanatory diagrams of unwrapping success/failure determination used for optimization of a threshold value.

FIG. 12 is an explanatory diagram of an unwrapping path which has been generated according to the present invention. In FIG. 12, starting from the pixel at a starting position 80, path search using the heap 44 having the ordering function and the queue 45 not having the ordering function is performed as shown in the first to third procedures of FIGS. 11A to 11C. For example, when phase non-continuous regions 82-1 to 82-3 due to dust or the like are present, the weights which are the magnitude of phase differences of the sides that cross the non-continuous regions 82-1 to 82-3 are equal to or more than the threshold value TH since the phase differences are large, and they are always stored in the heap 44. The heap 44 has the ordering function of arranging them in an ascending order, and a path is determined by retrieving them in the ascending order; therefore, the phase differences, i.e., weights of the sides that pass through the non-continuous regions having large weights remain until the end. As a result, an appropriate unwrapping path avoiding the non-continuous regions 82-1 to 82-3 can be determined. Thus, in the unwrapping path generating process of the present invention, selection of the threshold value TH for allocating candidate pixels to the heap 44 which is a data structure having the ordering function and the queue 45 which is a data structure not having the ordering function is important. For example, when the threshold value TH is set to be TH=2 π or more (threshold value TH=5 or more is set in the example of FIGS. 11A to 11C), all the pixels are processed in the queue 45 not having the ordering function, and a path which passes through the phase non-continuous regions is determined; therefore, it is highly possible that the phase unwrapping process fails. Meanwhile, when the threshold value TH is TH=0, all the pixels are processed in the heap 44 having the ordering function. Therefore, the possibility that a path that passes through non-continuous regions is avoided and the phase unwrapping process succeeds is high; however, since an ordering process is required every time a pixel is registered to the heap 44, processing time takes long. Threat, in the present invention, in order to achieve both the ability of avoiding non-continuous regions and shortening of processing time, phase unwrapping is performed with an initial threshold value which is set in advance, and, when the phase unwrapping fails, adjustment of the threshold value is performed until phase unwrapping succeeds by lowering the initial threshold value, thereby obtaining an optimal threshold value. Herein, the optimal threshold value TH is conceived to be changed depending on conditions of the sample 16 and the state of the optical system. Therefore, even when an optimal threshold value can be adjusted with a certain sample, it may not always be an optimal threshold value for another sample. Therefore, when the type of the measurement sample is changed, or when the product rod is changed, even if the type of the sample is the same, it is desired that the optimal threshold value be reset, and phase unwrapping from the predetermined initial threshold value be performed so as to automatically adjust it to an optimal value. As the initial threshold value TH0 used in the present invention, $6\sigma$ ($=2\times3\sigma$) is set as the initial threshold value based on a phase variation $\sigma$ in measurement of a flat sample having high reflectance such as a mirror; consequently, the possibility that pixels are processed in the queue 45 not having the ordering function with respect to phase differences due to measurement errors can be reduced. Main phase non-continuity of an optical part, a MEMS, or the like is due to dust, wiring, etc.; processing time of, for example, a sample having generally smooth surface can be significantly shortened when, in a setting in which $6\sigma$ is set as the initial threshold value based on the phase variation $\sigma$, the pixels managed in the queue 45 which is a data structure not having the ordering function are over 99% of all the pixels, and the ratio thereof managed in the heap 44 having the ordering function is suppressed to 1% or less. The phase shift method is said to have accuracy of 1/50 to 1/100 of an inspection wavelength; therefore, for example, a value which is about two times 1/100 of the inspection wavelength may be set as the initial threshold value TH0. In the determination of success or failure of phase unwrapping for lowering the initial threshold value to an optimal value, as shown in FIG. 13A focused on a region 84 of FIG. 12, with respect to, for example, a side 85-1 and a side 85-2 which are not a phase wrapping path, the following expression (5) is calculated, and when the number of the sides for which calculation results X are not 0 exceeds a predetermined number, it is determined that the phase unwrapping failed.

[Expression 5]

$$X = W_{ij} - (\phi'_j - \phi'_i) \quad (5)$$

Figure 13B:
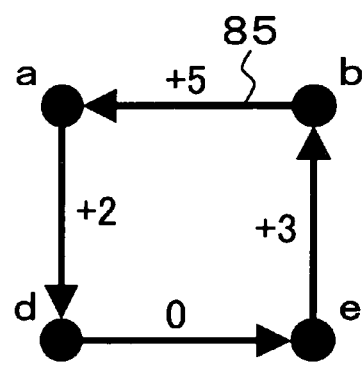

Herein, φi' and φj' are phase values at the pixels i and j after phase unwrapping, and Wij is a phase difference which is at the side 85-1 or the side 85-2 having the pixel i and the pixel j as vertices and is calculated and corrected according to the expressions (4). According to the expression (5), when the phase difference of the phase values of the pixels i and j after unwrapping at both ends of the side 85-1 or the side 85-2 obtained through phase unwrapping is equal to the corrected phase difference Wij obtained through the correction calculation from wrapping phases of the pixels i and j before unwrapping, the unwrapping process can be determined to be successful for this part. Conversely, when they are not equal, that is, the difference of them is not 0, the unwrapping process can be determined to be failure with respect to the side 85-1 or the side 85-2. Meanwhile, in a case in which the value X calculated for a side according to the expression (5) is not X=0, a value Y in which phase differences Wij of four adjacent pixels (a), (d), (e), and (b) surrounding the side 85-1 or the side 85-2 for which X is not 0 like FIG. 13B are added clockwise or counterclockwise is calculated according to the following expression.

[Expression 6]

$$Y = \Sigma W_{ij} \quad (6)$$

The side for which the value of Y calculated according to the expression (6) is not 0 but $\pm 2\pi$, that is, in the case of FIGS. 11A to 11C, the side that is $\pm 10$ since the range from $-\pi$ to $\pi$ is $-5$ to $5$ is eliminated from determination of phase unwrapping failure even if X is not 0 according to the expression (5). The reason for this is based on that, when the value Y calculated from the expression (6) is $Y=\pm 2\pi$, it originally contains a phase non-continuous side, and therefore X of the expression (5) for the side does not become 0 any way. For example, Y of the side 85-1 which passes through the phase non-continuous region 82-1 does not become zero, therefore, it is eliminated from determination of phase unwrapping failure. Furthermore, also in the case in which the sample originally has an acute step, X of the expression (5) does not become X=0; therefore, a mask or the like is imparted to that part in this case so as to eliminate it from determination targets. As a result, more precise unwrapping success/failure determination can be performed.

Figure 14:
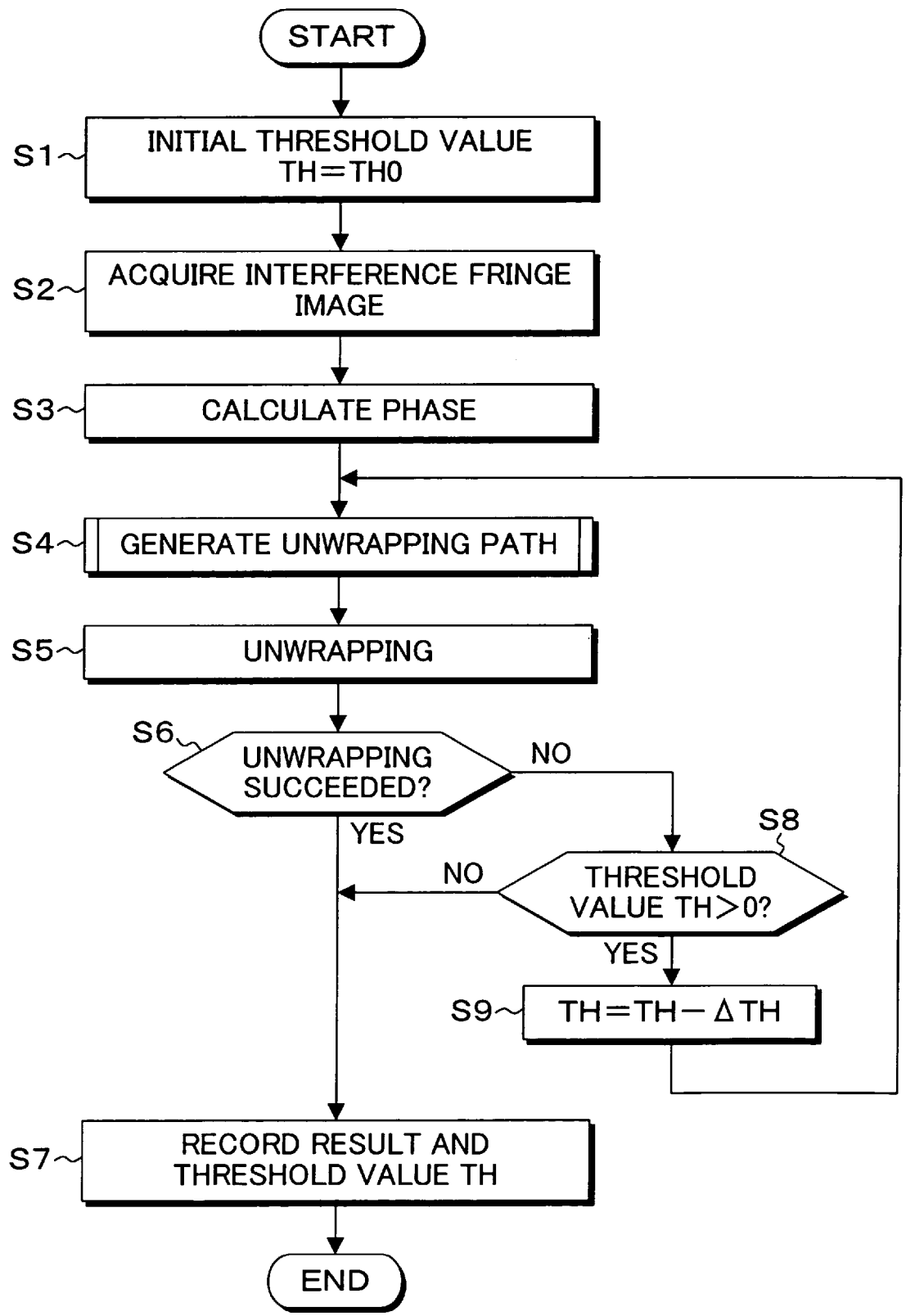
FIG. 14 is a flow chart of an interference measurement process according to the present invention.

FIG. 14 is a flow chart of an interference measurement process according to the present invention. In FIG. 14, in the interference measurement process, after the initial threshold value TH is set to TH0 in step S1, in step S2, an interference fringe image of the sample 16 is acquired by the CCD camera 26 by use of the interference optical system of FIG. 8 and stored in the interference fringe image file 36 of FIG. 9. Subsequently, in step S3, the wrapping phase distribution detection unit 38 calculates a wrapping phase, for example, by the phase shift method. Subsequently, in step S4, the unwrapping path generating unit 42 of FIG. 9 executes an unwrapping path generating process. When generation of an unwrapping path is finished, the unwrapping phase calculation unit 56 of FIG. 9 sequentially calculates unwrapping phases of respective pixels starting from an arbitrary pixel on the determined unwrapping path such as that shown in FIG. 12 by use of the corrected phase differences Wij which have already been calculated according to the expression (3), and stores the unwrapping phase distribution file 58. Subsequently, in step S6, a determination process of unwrapping success/failure such as that shown in FIGS. 13A and 13B are performed; and, if the unwrapping succeeds, in step S7, the result is stored in a file, and the result is displayed in the monitor 32. Meanwhile, if unwrapping failure is determined in step S6, and if the threshold value TH is 0 or more in step S8, the process proceeds to step S9 wherein the threshold value is lowered by a predetermined value ΔTH which is set in advance, and the unwrapping path generation from step S4 is repeated. When unwrapping succeeds in step S6 through the repetition of the unwrapping process in which the threshold value TH is lowered, storage, display, etc. of the result is performed in step S7. The threshold value at this point of successful unwrapping is an optimal threshold value for this sample; and, with respect to samples and the like generated by the same rod, the optimal threshold value TH adjusted in the process of steps S6 to S9 serves as the initial threshold value of step S1 so as to execute the interference measurement process.

Figure 15B:
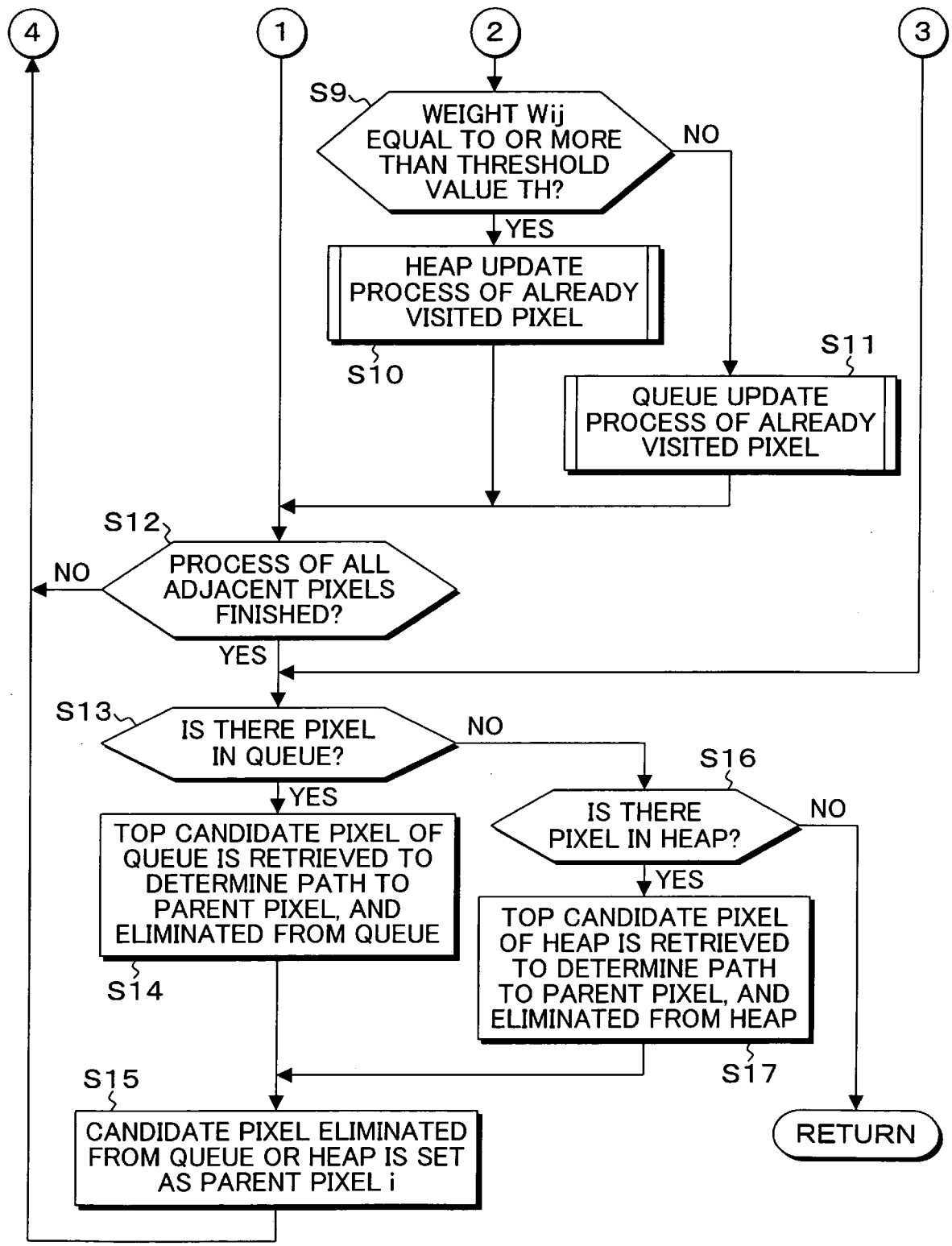

FIGS. 15A and 15B are flow charts of the unwrapping path generating process in step S4 of FIG. 14. In FIGS. 15A are 15B, in the unwrapping path generating process, after a starting pixel is initially set as a parent pixel i in step S1; in step S2, an adjacent pixel is searched around the parent pixel i; and, when an adjacent pixel is determined in step S3, in step S4, the adjacent pixel is set as a candidate pixel j, a phase difference Wij corrected according to the expression (4) and the magnitude |Wij| of the phase difference are obtained, and pixel data j(i, |Wij|) containing them is generated. This is a process of the candidate pixel generating unit 46 in the wrapping path generating unit 42 of FIG. 9. Subsequently, in step S5, the registration control unit 48 checks whether the candidate pixel j has been visited or not, that is, whether it is registered in the heap 44 or the queue 45; and, if it is unregistered, the process proceeds to step S6 wherein whether the weight |Wij| is equal to the threshold value TH or more is checked. If it is less than the threshold value TH, the data j(i, |Wij|) of the candidate pixel j is registered to the queue 45 in step S7. If it is equal to or more than the threshold value TH, in step S8, the data j(i, |Wij|) of the candidate pixel j is registered to the heap 44, and the heap is updated, more specifically, it is ordered such that a candidate pixel having the minimum weight is at the root (lowest). In step S5, if the candidate pixel j is a visited pixel, that is, if it has been registered to the heap 44 or the queue 45, the process proceeds to step S9 wherein whether the weight |Wij| is equal to the threshold value TH or more is checked; and, if it is equal to or more than the threshold value TH, a heap update process of the visited pixel of step S10 is executed. Meanwhile, if it is less than the threshold value TH, a queue update process of the visited pixel of step S11 is executed. The processes of steps S10 and S11 will be elucidated in the following description. Subsequently, in step S12, whether processes of all adjacent pixels have finished or not is checked, and, until the processes are finished, the processes from step S2 are repeated. When it is determined in step S12 that the processes of all the adjacent pixels are finished; in step S13, first, the path determination unit 50 of FIG. 9 checks whether there is a candidate pixel in the queue 45 or not.

When there is a candidate pixel in the queue 45, in step S14, the oldest top candidate pixel of the queue is retrieved and eliminated, and a path between it and the parent pixel of the eliminated candidate pixel is determined. Then, in step S15, the candidate pixel eliminated from the queue 45 is set as the parent pixel i, and the process returns to the process of step S2. If there is no pixel in the queue 45 in step S13, whether there is a pixel or not in the heap 44 is checked in step S16. If there is a pixel, in step S17, a top candidate pixel of the heap 44 having the minimum weight is retrieved and eliminated, and a path between it and the parent pixel of the eliminated candidate pixel is determined. Then, in step S15, the candidate pixel eliminated from the heap 44 is set as the candidate pixel i, and the process returns to step S2. Furthermore, in step S16, when there is no pixel also in the heap 44, the path of all the pixels has been determined; therefore, the series of processes is finished, and the process returns to the main routine of FIG. 14.

FIG. 16 is a flow chart of the heap update process of the visited pixel of step S10 of FIGS. 15A are 15B. In FIG. 16, first, in step S1, whether the weight of the registered pixel which has already been registered in the heap 44 is larger than the weight of the new candidate pixel or not is checked. When the weight of the registered pixel is larger than the weight of the new candidate pixel, in step S2, the parent pixel and the value of the weight in the pixel, i.e., the pixel data registered in the heap are updated by rewriting them by the parent pixel and the weight of the new candidate pixel. Then, in step S3, an update process of the heap with respect to the updated pixel data is performed, more specifically, the candidate pixel having the minimum weight is ordered to be at the root (lowest) of the heap. Meanwhile, when the weight of the registered pixel registered in the heap 44 is smaller in step S1, the parent pixel and the weight of the registered pixel are not required to be updated; therefore, the new candidate pixel is discarded in step S4.

Figure 17:
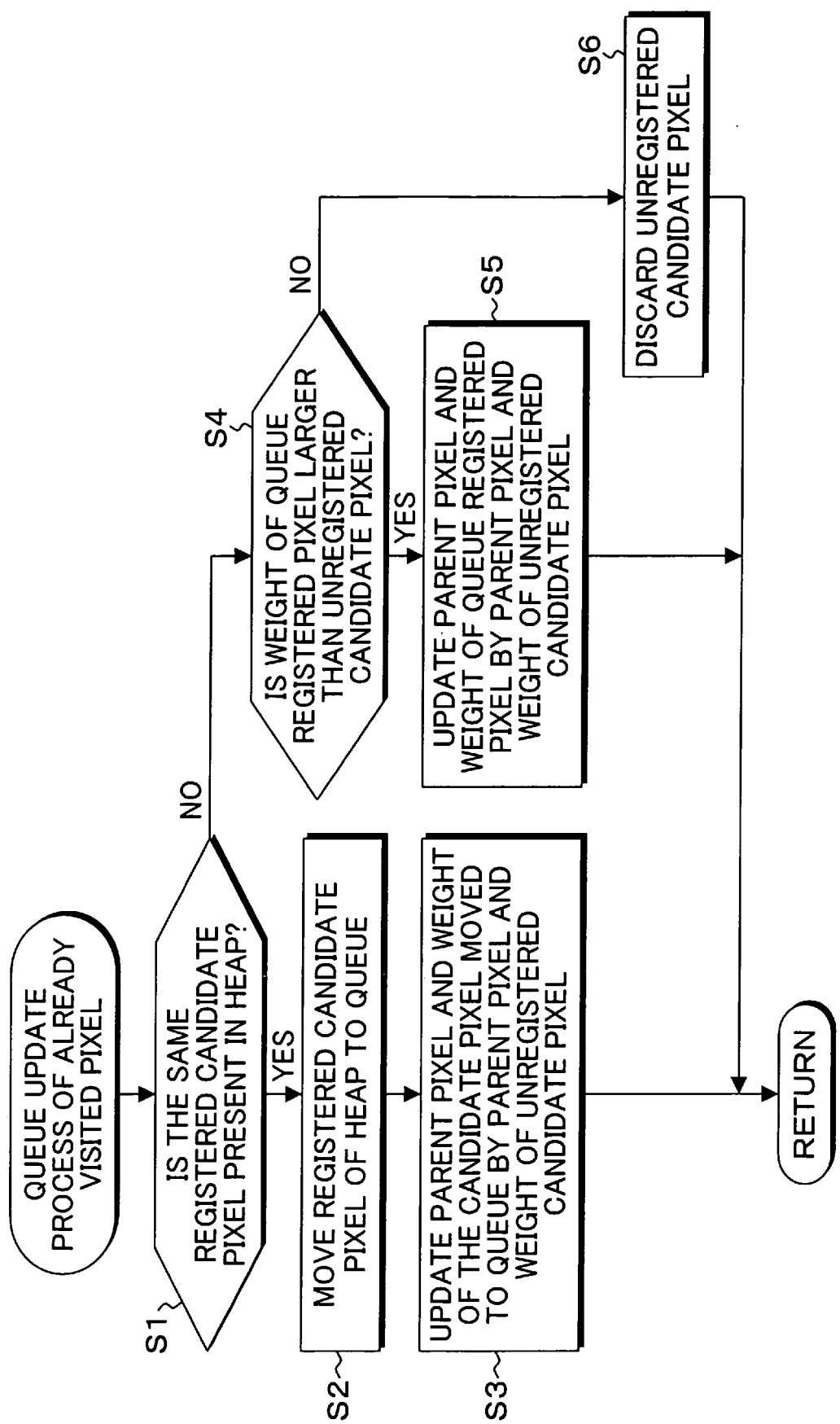
FIG. 17 is a flow chart of the queue update process of the visited pixel of step S11 of FIGS. 15A and 15B.

FIG. 17 is a flow chart of the queue update process of the visited pixel of step S11 of FIGS. 15A and 15B. In FIG. 17, first, in step S1, whether the registered candidate pixel which is same as the new candidate pixel which is to be registered is present in the heap 44 or not is checked. If it is present in the heap 44, the registered candidate pixel of the heap is moved to the queue 45 in step S2; and, in step S3, the parent pixel of the candidate pixel which has been moved to the queue is updated by rewriting it by the parent pixel of the new candidate pixel. This process is the process shown by the dotted arrow 75 of the third procedure of FIG. 11C. Meanwhile, when the registered candidate pixel same as the new candidate pixel is not present in the heap 44 in step S1, the new candidate pixel is discarded in step S4 since the registered candidate pixel same as the new candidate pixel is supposed to have been registered in the queue 45.

Figure 18:
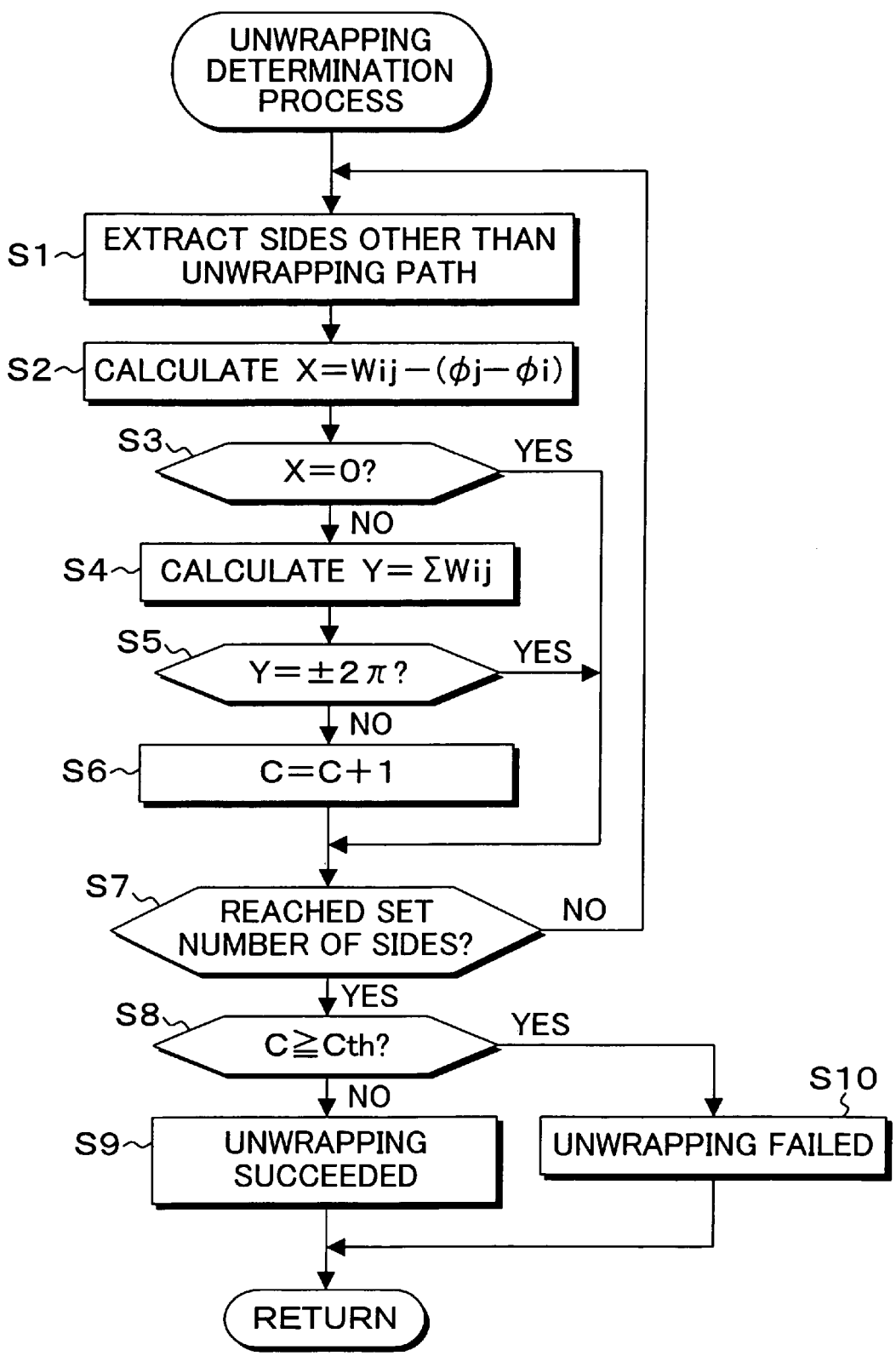
FIG. 18 is a flow chart of the unwrapping success/failure determination of step S6 if FIG. 14.

FIG. 18 is a flow chart of the unwrapping success/failure determination of step S6 of FIG. 14. In FIG. 18, in the unwrapping determination process, a side other than the unwrapping path is extracted in step S1, X is calculated according to the expression (5) in step S2, and, if it is not X=0 in step S3, the expression (6) is calculated in step S4. If Y is not ±2π in step S5, the process proceeds to step S6 wherein the number C of failed sides is counted up by one. Subsequently, in step S7, whether it reached the set side number which is set for determination, that is, it reached the maximum number or not is checked, and the processes from step S1 are repeated until it reaches the set side number. When it reaches the process of the set side number in step S7, whether a counter C is equal to or more than the predetermined number of times Cth of threshold values or not is checked in step S8. If it is less than the number of times Cth of threshold values, successful unwrapping is determined in step S9. Meanwhile, in step S8, if the value of the counter C is equal to or more than the number of times Cth of threshold values, unwrapping failure is determined in step S10.

Figure 19:
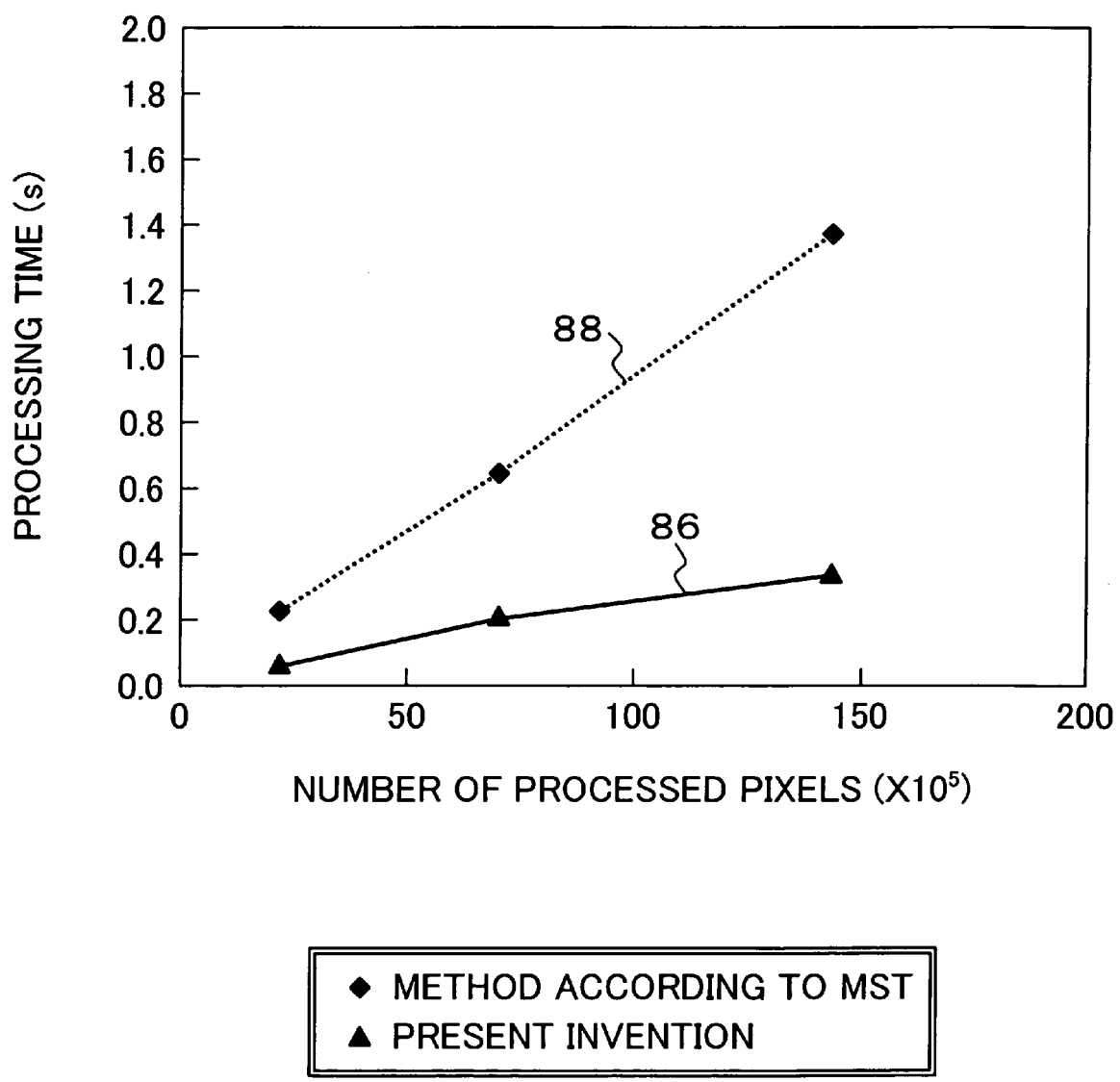
FIG. 19 is a characteristic chart showing processing time with respect to the number of processed pixels in the unwrapping process of the present invention in contrast with a conventional MST method.

FIG. 19 is a characteristic chart showing processing time with respect to the number of processed pixels in the unwrapping process of the present invention in contrast with a conventional MST method. In FIG. 19, the processing time with respect to the number of processed pixels of the present invention is a characteristic 86, and, in contrast, a characteristic according to the conventional MST method will be that of 88. When the characteristic 86 of the present invention is compared with the characteristic 88 according to the MST method, the process of the phase unwrapping process according to the present invention can be finished in the time that is about ¼ the process according to the conventional MST method.

FIGS. 20A to 20C are explanatory diagrams of unwrapping path generating procedures according to the present invention in a case in which a stack is used as a data structure not having the ordering function. In FIGS. 20A to 20C, as shown in FIGS. 20A to 20C, they are shown separately in first to third procedures, and, in this embodiment, a stack 90 is provided as a data structure used in generation of an unwrapping path and as a data structure not having the ordering function with respect to the heap 44 having the ordering function. The stack 90 sequentially stores registered data, and is a first-in last-out data structure wherein the newest data is retrieved as retrieved data. When the stack 90 is used as a data structure not having the ordering function in this manner, although storage of pixel data of candidate pixels with respect to the heap 44 and the stack 90 in the first to third procedures is same as the case in which the queue 45 of FIGS. 11A to 11C are used, in retrieval of data from the stack 90, the newest registered data is eliminated, and an unwrapping path is determined for the eliminated data.

Therefore, although the first procedure and the second procedure of FIGS. 20A and 20B are same as FIGS. 11A to 11C, the third procedure of FIG. 20C is different from the case in which the queue 45 of FIG. 11C is used in the point that the pixel data of the candidate pixel b which is the newest registered data is retrieved from the stack 90 and eliminated, and the side (e→b) between the eliminated candidate pixel b and the parent pixel e thereof is determined. Also in the case in which the stack 90 is used in this manner instead of the queue 45 as a data structure not having the ordering function, an unwrapping path generating process in which both the avoiding ability of phase non-continuous regions and shortening of processing time can be realized by optimizing the threshold value for allocation to the heap 44 and the stack 90 exactly in the same manner. The present invention also provides an unwrapping program executed in, for example, the personal computer 30 which is provided in the interference measurement apparatus, and the unwrapping program has the contents of the flow charts of FIG. 14, FIGS. 15A and 15B, FIG. 16, FIG. 17, and FIG. 18. The present invention also provides a computer readable recording medium in which the unwrapping program is stored. The recording medium includes a portable-type storage medium such as a CD-ROM, a floppy disk (R), a DVD disk, or a magnetooptical disk; a storage device such as a hard disk provided at interior/exterior of the computer; a database or another computer and a database thereof retaining the program via a line; and a transmission medium on a line. It should be noted that the present invention includes arbitrary modifications that do not impair the objects and advantages thereof, and is not limited by the numerical values shown in the above described embodiments.

What is claimed is:

1. A phase unwrapping method of generating a wrapping phase distribution in which pixels of wrapped phases are two-dimensionally disposed according to an interference fringe image of a measurement object, and determining an unwrapping path connecting pixels of unwrapped phases according to the wrapping phase distribution; the phase unwrapping method characterized by having a candidate pixel generating step of setting a starting pixel or a path-determined latest pixel as a parent pixel, searching a path-undetermined adjacent pixel which is adjacent around the parent pixel, and generating, with respect to the searched adjacent pixel, a candidate pixel having pixel data in which the parent pixel and a weight which is magnitude of a phase difference in which phase skip between the pixels is corrected are combined;

a registration control step of, if the weight of the candidate pixel is equal to or more than a predetermined threshold value, registering the pixel to a first data registration unit having a function of ordering the registration order and ordering the pixel based on the weight, and, if it is less than the threshold value, registering the pixel to a second data registration unit not having the function of ordering the registration order; and a path determination step of, every time the process in which all the adjacent pixel around the parent pixel is set as the candidate pixel is finished, retrieving and eliminating one candidate pixel in accordance with the registration order from the second data registration unit if the candidate pixels are present in the first data registration unit and the second data registration unit or if the candidate pixel is present merely in the second data registration unit, retrieving and eliminating the candidate pixel having an ordered minimum weight if the candidate pixel is present merely in the first data registration unit, determining a path between the eliminated candidate pixel and the parent pixel, and passing the eliminated pixel to the candidate pixel generating step as a next parent pixel.

2. The method according to claim 1, characterized in that, in the registration control step, if the weight of the candidate pixel generated in the candidate pixel generating step is less than the threshold value, and the same candidate pixel is registered in the first data registration unit, the registered candidate pixel of the first data registration unit is moved to the second data registration unit, and the parent pixel is rewritten by the parent pixel of the candidate pixel generated in the candidate pixel generating step.

3. The method according to claim 1, characterized in that, in the registration control step, if the weight of the candidate pixel generated in the candidate pixel generating step is equal to or more than the threshold value, and the same candidate pixel is registered in the first registration unit; and if the weight of the registered candidate pixel is large, after the pixel is rewritten by the parent pixel and the weight of the candidate pixel generated in the candidate pixel generating step, the pixel is ordered, and if the weight of the registered candidate pixel is small, the candidate pixel generated in the candidate pixel generating step is discarded, and the registered candidate pixel is caused to remain.

4. The method according to claim 1 characterized in that, in the registration control step, if the weight of the candidate pixel generated in the candidate pixel generating step is less than the threshold value, and the same candidate pixel is registered in the second data registration unit, the candidate pixel generated in the candidate pixel generating step is discarded, and the registered candidate pixel is caused to remain.

5. The method according to claim 1, characterized in that the first data registration unit is a heap.

6. The method according to claim 1, characterized in that the second data registration unit is a queue having a first-in first-out function or a stack having a first-in last-out function.

7. The method according to claim 1, characterized by further having a threshold value setting step of variably setting the threshold value used in the registration control step.

8. The phase unwrapping method described in claim 7, characterized in that, in the threshold value setting step, an optimal threshold value is determined based on variation information of phases of a phase distribution obtained from an interference fringe image of a predetermined sample.

9. The phase unwrapping method described in claim 7, characterized in that in the threshold value setting step, with respect to the determined unwrapping path of the measurement object, a phase difference after unwrapping and a phase difference according to an unwrapping correction calculation are compared with each other with respect to adjacent pixels which are not the unwrapping path, and unwrapping failure is determined when the discrepant pixels exceed a predetermined number; and, when the number of times of unwrapping failure exceeds a predetermined number of times, the threshold value used for determination of the unwrapping path is lowered, and the process of determining an unwrapping path is retried.

10. A computer-readable storage medium which stores a phase unrapping program characterized by causing a computer of an interference measurement apparatus for generating a wrapping phase distribution in which pixels of wrapped phases are two-dimensionally disposed according to an interference fringe image of a measurement object, and determining an unwrapping path connecting pixels of unwrapped phases according to the wrapping phase distribution, to execute a candidate pixel generating step of setting a starting pixel or a path-determined latest pixel as a parent pixel, searching a path-undetermined adjacent pixel which is adjacent around the parent pixel, and generating, with respect to the searched adjacent pixel, a candidate pixel having pixel data in which the parent pixel and a weight which is magnitude of a phase difference in which phase skip between the pixels is corrected are combined;

a registration control step of, if the weight of the candidate pixel is equal to or more than a predetermined threshold value, registering the pixel to a first data registration unit having a function of ordering the registration order and ordering the pixel based on the weight, and, if it is less than the threshold value, registering the pixel to a second data registration unit not having the function of ordering the registration order; and a path determination step of, every time the process in which all the adjacent pixel around the parent pixel is set as the candidate pixel is finished, retrieving and eliminating one candidate pixel in accordance with the registration order from the second data registration unit if the candidate pixels are present in the first data registration unit and the second data registration unit or if the candidate pixel is present merely in the second data registration unit, retrieving and eliminating the candidate pixel having an ordered minimum weight if the candidate pixel is present merely in the first data registration unit, determining a path between the eliminated candidate pixel and the parent pixel, and passing the eliminated pixel to the candidate pixel generating step as a next parent pixel.

11. The storage medium according to claim 10, characterized in that, in the registration control step, if the weight of the candidate pixel generated in the candidate pixel generating step is less than the threshold value, and the same candidate pixel is registered in the first data registration unit, the registered candidate pixel of the first data registration unit is moved to the second data registration unit, and the parent pixel is rewritten by the parent pixel of the candidate pixel generated in the candidate pixel generating step.

12. The storage medium according to claim 10, characterized in that, in the registration control step, if the weight of the candidate pixel generated in the candidate pixel generating step is equal to or more than the threshold value, and the same candidate pixel is registered in the first registration unit; and if the weight of the registered candidate pixel is large, after the pixel is rewritten by the parent pixel and the weight of the candidate pixel generated in the candidate pixel generating step, the pixel is ordered, and if the weight of the registered candidate pixel is small, the candidate pixel generated in the candidate pixel generating step is discarded, and the registered candidate pixel is caused to remain.

13. The storage medium according to claim 10 characterized in that, in the registration control step, if the weight of the candidate pixel generated in the candidate pixel generating step is less than the threshold value, and the same candidate pixel is registered in the second data registration unit, the candidate pixel generated in the candidate pixel generating step is discarded, and the registered candidate pixel is caused to remain.

14. The storage medium according to claim 10, characterized in that the first data registration unit is a heap.

15. The storage medium according to claim 10, characterized in that the second data registration unit is a queue having a first-in first-out function or a stack having a first-in last-out function.

16. The storage medium according to claim 10, characterized by further having a threshold value setting step of variably setting the threshold value used in the registration control step.

17. An interference measurement apparatus for generating a wrapping phase distribution in which pixels of wrapped phases are two-dimensionally disposed according to an interference fringe image of a measurement object, and determining an unwrapping path connecting pixels of unwrapped phases according to the wrapping phase distribution; the interference measurement apparatus characterized by having a first data registration unit having a function of ordering the registration order of registered information;

a second data registration unit not having the function of ordering the registration order of registered information;

a candidate pixel generating unit for setting a starting pixel or a path-determined latest pixel as a parent pixel, searching a path-undetermined adjacent pixel which is adjacent around the parent pixel, and generating, with respect to the searched adjacent pixel, a candidate pixel having pixel data in which the parent pixel and a weight which is magnitude of a phase difference in which phase skip between the pixels is corrected are combined;

a registration control unit for, if the weight of the candidate pixel is equal to or more than a predetermined threshold value, registering the pixel to a first data registration unit and ordering the pixel based on the weight, and, if it is less than the threshold value, registering the pixel to a second data registration unit; and a path determination unit for, every time the process in which all the adjacent pixel around the parent pixel is set as the candidate pixel is finished, retrieving and eliminating one candidate pixel in accordance with the registration order from the second data registration unit if the candidate pixels are present in the first data registration unit and the second data registration unit or if the candidate pixel is present merely in the second data registration unit, retrieving and eliminating the candidate pixel having an ordered minimum weight if the candidate pixel is present merely in the first data registration unit, determining a path between the eliminated candidate pixel and the parent pixel, and passing the eliminated pixel to the candidate pixel generating unit as a next parent pixel.

18. The apparatus according to claim 17, characterized in that, if the weight of the candidate pixel generated in the candidate pixel generating unit is less than the threshold value, and the same candidate pixel is registered in the first data storage unit, the registration control unit moves the registered candidate pixel of the first data registration unit to the second data registration unit, and rewrites the parent pixel by the parent pixel of the candidate pixel generated in the candidate pixel generating unit.

19. The apparatus according to claim 17, characterized in that the first data registration unit is a heap, and the second data registration unit is a queue having a first-in first-out function or a stack having a first-in last-out function.

* * * * *

UNITED STATES PATENT AND TRADEMARK OFFICE
CERTIFICATE OF CORRECTION

PATENT NO.         : 7,593,596 B2
APPLICATION NO. : 11/407036
DATED                : September 22, 2009
INVENTOR(S)       : Fumiyuki Takahashi et al.

It is certified that error appears in the above-identified patent and that said Letters Patent is hereby corrected as shown below:

Column 21, Line 33, change "unrapping" to --unwrapping--.

Signed and Sealed this

Twenty-ninth Day of December, 2009

David J. Kappos
*Director of the United States Patent and Trademark Office*